US011168761B2

United States Patent
Kiyota et al.

(10) Patent No.: US 11,168,761 B2
(45) Date of Patent: Nov. 9, 2021

(54) WORM WHEEL, WORM REDUCTION GEAR, AND METHOD FOR PRODUCING WORM WHEEL

(71) Applicant: NSK LTD., Tokyo (JP)

(72) Inventors: Haruhiko Kiyota, Maebashi (JP); Takeshi Yamamoto, Maebashi (JP); Kaname Yasuda, Maebashi (JP); Tomohiro Arai, Maebashi (JP); Junichi Takano, Maebashi (JP); Kazuki Hotta, Maebashi (JP)

(73) Assignee: NSK LTD., Tokyo (JP)

( * ) Notice: Subject to any disclaimer, the term of this patent is extended or adjusted under 35 U.S.C. 154(b) by 707 days.

(21) Appl. No.: 16/074,354

(22) PCT Filed: Jan. 26, 2017

(86) PCT No.: PCT/JP2017/002680
§ 371 (c)(1),
(2) Date: Jul. 31, 2018

(87) PCT Pub. No.: WO2017/135141
PCT Pub. Date: Aug. 10, 2017

(65) Prior Publication Data
US 2021/0088112 A1 Mar. 25, 2021

(30) Foreign Application Priority Data

Feb. 2, 2016 (JP) .............................. JP2016-018233
Oct. 18, 2016 (JP) .............................. JP2016-204200
Dec. 22, 2016 (JP) .............................. JP2016-249614

(51) Int. Cl.
*F16H 1/16* (2006.01)
*B29C 45/14* (2006.01)
(Continued)

(52) U.S. Cl.
CPC ............... *F16H 1/16* (2013.01); *B29C 45/14* (2013.01); *B29C 45/2708* (2013.01);
(Continued)

(58) Field of Classification Search
CPC ........ F16H 1/16; B29C 45/14; B29C 45/2708
(Continued)

(56) References Cited

U.S. PATENT DOCUMENTS 6,626,261 B1 * 9/2003 Kurokawa ........... B62D 5/0409
180/444
8,978,502 B2 * 3/2015 Albrecht ................... F16H 1/16
74/446

(Continued)

FOREIGN PATENT DOCUMENTS

EP 2735771 A1 5/2014
EP 2960550 A1 12/2015
(Continued)

OTHER PUBLICATIONS

International Search Report dated May 9, 2017 by the International Searching Authority in counterpart International Patent Application No. PCT/JP2017/002680. (PCT/ISA/210).
(Continued)

*Primary Examiner* — William C Joyce
(74) *Attorney, Agent, or Firm* — Sughrue Mion, PLLC

(57) ABSTRACT

An inner wheel element (15a) is embedded in an outer wheel element (16a), such that a continuous range from an inner diameter side circumferential surface configuring an inner surface of a first annular concave part (22), through an outer circumferential surface of the inner wheel element (15a), to an inner diameter side circumferential surface configuring an inner surface of a second annular concave part (38) in a surface of the inner wheel element (15a) is covered over the entire circumference. Accordingly, a structure is achieved
(Continued)

which easily secures a holding power of the synthetic resin outer wheel element with respect to the inner wheel element.

17 Claims, 25 Drawing Sheets

(51) Int. Cl.
    *B29C 45/27*     (2006.01)
    *F16C 19/16*     (2006.01)
    *F16H 55/06*     (2006.01)
    *F16H 55/17*     (2006.01)
    *B29K 705/00*     (2006.01)
    *B29L 15/00*     (2006.01)
    *B62D 5/04*     (2006.01)

(52) U.S. Cl.
    CPC .............. *F16C 19/16* (2013.01); *F16H 55/06* (2013.01); *F16H 55/17* (2013.01); *B29K 2705/00* (2013.01); *B29L 2015/003* (2013.01); *B62D 5/0403* (2013.01); *F16C 2361/61* (2013.01)

(58) Field of Classification Search
    USPC ............................................ 74/451, DIG. 10
    See application file for complete search history.

(56) References Cited

U.S. PATENT DOCUMENTS

| | | | |
|---|---|---|---|
| 2001/0039730 A1 | 11/2001 | Fujita et al. | |
| 2002/0043124 A1* | 4/2002 | Shiga ..................... | B29D 15/00 74/434 |
| 2008/0178697 A1 | 7/2008 | Imagaki et al. | |
| 2012/0111144 A1 | 5/2012 | Wakugawa | |
| 2015/0129348 A1 | 5/2015 | Kiyota et al. | |
| 2015/0345609 A1 | 12/2015 | Kiyota et al. | |
| 2015/0354687 A1 | 12/2015 | Kiyota et al. | |
| 2015/0354688 A1 | 12/2015 | Kiyota et al. | |

FOREIGN PATENT DOCUMENTS

| | | | |
|---|---|---|---|
| JP | 52-27966 U1 | | 2/1977 |
| JP | 2001-315160 A | | 11/2001 |
| JP | 2003-21223 A | | 1/2003 |
| JP | 2005-305779 | * | 11/2005 |
| JP | 2005-305779 A | | 11/2005 |
| JP | 2007-331662 A | | 12/2007 |
| JP | 2008-183940 A | | 8/2008 |
| JP | 2012-86579 A | | 5/2012 |
| JP | WO2013/084613 A1 | | 6/2013 |
| JP | 2015-17706 A | | 1/2015 |
| WO | 2013/084613 A1 | | 6/2013 |

OTHER PUBLICATIONS

Written Opinion dated May 9, 2017 by the International Searching Authority in counterpart International Patent Application No. PCT/JP2017/002680. (PCT/ISA/237).

Communication dated Jan. 30, 2018, from the European Patent Office in counterpart European Application No. 17747299.0.

* cited by examiner

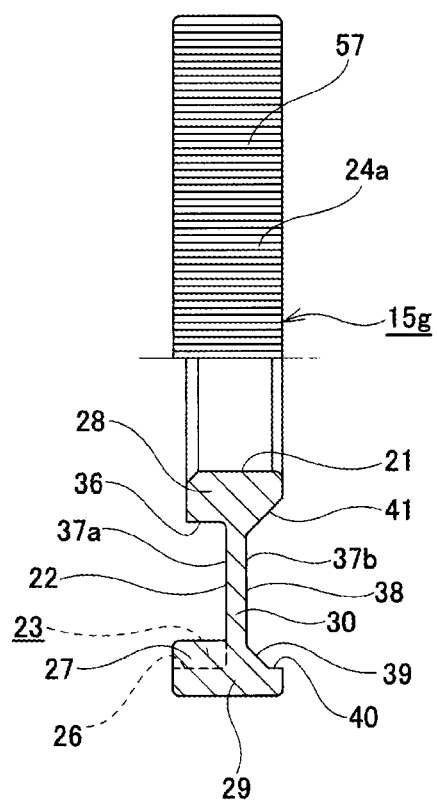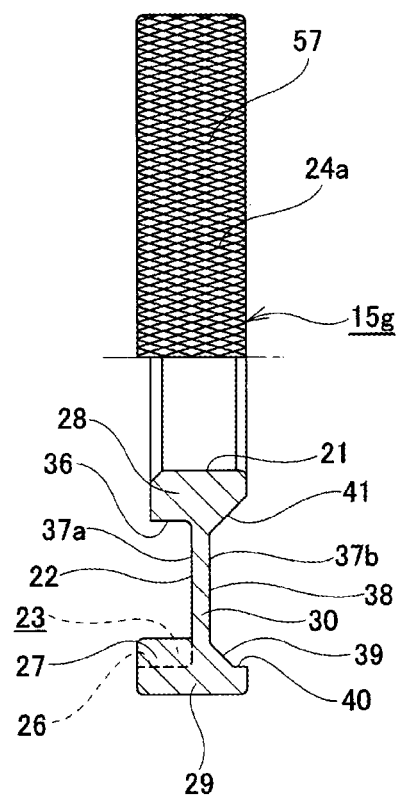

WORM WHEEL, WORM REDUCTION GEAR, AND METHOD FOR PRODUCING WORM WHEEL

TECHNICAL FIELD

The present invention relates to a worm wheel which includes an inner wheel element which serves as a core material and a synthetic resin outer wheel element having a tooth part, a worm reduction gear including the worm wheel, and a manufacturing method of the worm wheel.

BACKGROUND ART

FIGS. 20 to 25 illustrate one example of an electric power steering device which is described in Patent Document 1 and the like and is known from the past. A front end part of a steering shaft 2 in which a steering wheel 1 is attached to a rear end part is rotatably supported in a housing 3. A worm wheel 4 is fixed to a portion driven rotationally by the steering shaft 2. On the other hand, a worm shaft 6 is connected to an output shaft of an electric motor 5. Further, a worm tooth part 18 provided in an outer circumferential surface of an axial intermediate portion of the worm shaft 6 is engaged with a worm wheel tooth part 19 provided in the outer circumferential surface of the worm wheel 4, so that a predetermined magnitude of the auxiliary torque (auxiliary power) can be applied with respect to the worm wheel 4 from the electric motor 5 in a predetermined direction.

The worm wheel 4 is externally fitted and fixed to an axial intermediate portion of the output shaft 7 which serves as an output part of the auxiliary torque, and is rotated together with the output shaft 7. The output shaft 7 is coupled with the front end part of the steering shaft 2 through a torsion bar 9 in the housing 3 in a state where a portion near both ends of the axial intermediate portion is supported to be rotatable only by one pair of rolling bearings 8a and 8b. The electric motor 5 rotationally drives the worm shaft 6 according to a direction and a magnitude of a steering torque which is detected by a torque sensor 10 and is applied from the steering wheel 1 to the steering shaft 2, and the auxiliary torque is applied to the output shaft 7. The rotation of the output shaft 7 is transmitted to a pinion shaft 14 which serves as an input part of a steering gear unit 13 through one pair of universal joints 11a and 11b and an intermediate shaft 12, and a desired steering angle is given to a steering wheel.

In the case of the illustrated example, the worm wheel 4 is formed by combining a metal inner wheel element 15 which serves as a core material and a synthetic resin outer wheel element 16. That is, in the worm wheel 4, the portion which is externally fitted and fixed to the output shaft 7 serves as the metal inner wheel element 15 having a circular ring shape, and the portion including the worm wheel tooth part 19 serves as the synthetic resin outer wheel element 16. Further, as described above, the outer wheel element 16 is made of a synthetic resin, so as to facilitate an operation (cost reduction) that forms the worm wheel tooth part 19 in the outer circumferential surface of the worm wheel 4, and to reduce a tooth hitting noise generated in the engaging portion between the worm tooth part 18 of the worm shaft 6 and the worm wheel tooth part 19 of the worm wheel 4.

The outer wheel element 16 is made of a synthetic resin, and a radially outer end part of the inner wheel element 15 is embedded therein over the entire circumference through an injection molding (insertion molding). In the outer circumferential surface of the inner wheel element 15, a (gear-shaped) concave-convex part 17 in a circumferential direction is provided, and a portion of a synthetic resin configuring the outer wheel element 16 enters into a plurality of concave parts configuring the concave-convex part 17, so as to improve a holding power of the outer wheel element 16 in a rotation direction with respect to the inner wheel element 15.

In the case of the above-described structure in the related art, only the radially outer end part of the inner wheel element 15 is embedded in the outer wheel element 16, so as to secure the holding power of the outer wheel element 16 with respect to the inner wheel element 15. For this reason, there is still room for improvement in the holding power.

Incidentally, in the case of the above-described structure in the related art, the concave-convex part 17 in the circumferential direction is provided in the outer circumferential surface of the inner wheel element 15, and the portion of a synthetic resin configuring the outer wheel element 16 enter into the plurality of concave parts configuring the concave-convex part 17. For this reason, in the outer wheel element 16, the portion which is superimposed on the radially outer side with respect to the concave-convex part 17 may have different the radial thickness for each of portions in which a plurality of teeth 20 and 20 configuring the worm wheel tooth part 19 are positioned (see FIGS. 24 and 25). In this case, the molding shrinkage amount during the injection molding is different (is large in a portion (for example, α portion of FIG. 25) having a large radial thickness, and is small in a portion (for example, β portion of FIG. 25) having a small radial thickness) for each of portions where the plurality of teeth 20 and 20 are positioned. Thus, a difference occurs in sizes of the plurality of teeth 20 and 20 after molding, so that a manufacturing error such as a pitch error may occur in the worm wheel tooth part 19.

RELATED ART REFERENCE

Patent Document

Patent Document 1: JP-T-2013-084613

SUMMARY OF THE INVENTION

Problems to be Solved by the Invention

The invention is made in consideration of the above-described situation, and an object thereof is to implement a structure which can improve a holding power of a synthetic resin outer wheel element with respect to an inner wheel element which serves as a core material.

Means for Solving the Problems

A worm wheel of the invention includes an inner wheel element and an outer wheel element.

The inner wheel element has a first annular concave part provided to be recessed in an axial direction in an axial one-side surface.

The outer wheel element is made of a synthetic resin, and has a worm wheel tooth part in an outer circumferential surface, and the inner wheel element is embedded in the outer wheel element, such that a continuous range from an inner diameter side circumferential surface configuring an inner surface of the first annular concave part through an outer circumferential surface of the inner wheel element to a portion (positioned radially inside compared to the radial intermediate position) near a radially inner end of an axial other-side surface of the inner wheel element in a surface of the inner wheel element is covered over an entire circumference.

Incidentally, in a case where the invention is implemented, metal may be adopted as a material of the inner wheel element. However, for example, a synthetic resin may be adopted which is excellent in the thermal resistance compared to the material of the outer wheel element and hardly receives heat effect when the outer wheel element is injection-molded (for example, thermoplastic resin is adopted as the synthetic resin configuring the outer wheel element, and a thermosetting resin is adopted as the synthetic resin configuring the inner wheel element).

In a case where the worm wheel of the invention is implemented, for example, a second annular concave part is provided to be recessed in the axial direction in the axial other-side surface of the inner wheel element. The inner wheel element may be embedded in the outer wheel element, such that a continuous range from the inner diameter side circumferential surface configuring the inner surface of the first annular concave part through the outer circumferential surface of the inner wheel element to an inner diameter side circumferential surface configuring an inner surface of the second annular concave part in the surface of the inner wheel element is covered over an entire circumference.

In a case where the worm wheel of the invention is implemented, for example, a tilted surface part which is tilted in a direction in which a width dimension in a radial direction of the second annular concave part becomes larger toward an axial other side with respect to a central axis of the inner wheel element may be provided in at least one circumferential surface among an outer diameter side circumferential surface and the inner diameter side circumferential surface configuring the inner surface of the second annular concave part.

In a case where the worm wheel of the invention is implemented, for example, the tilted surface part and a non-tilted surface part which is not tilted with respect to the central axis of the inner wheel element may be provided in the outer diameter side circumferential surface configuring the inner surface of the second annular concave part.

In a case where the worm wheel of the invention is implemented, for example, the tilted surface part and the non-tilted surface part which is not tilted with respect to the central axis of the inner wheel element may be provided in the inner diameter side circumferential surface configuring the inner surface of the second annular concave part.

In a case where the worm wheel of the invention is implemented, for example, in the inner wheel element, a portion which is positioned on a radially outer side from the first annular concave part and the second annular concave part and a portion which is interposed between a bottom surface of the first annular concave part and a bottom surface of the second annular concave part are each formed such that axial dimensions of both portions which interpose a central position of the inner wheel element in the axial direction may be the same as each other. In the outer wheel element, a portion which is positioned on a radially outer side from the inner wheel element and a portion which is superimposed in the axial direction with respect to the portion which is positioned on the radially outer side from the first annular concave part and the second annular concave part in the inner wheel element are each formed such that axial dimensions of both portions which interpose the central position of the inner wheel element in the axial direction may be the same as each other.

In a case where the worm wheel of the invention is implemented, for example, a concave-convex part in a circumferential direction may be provided in the surface of the inner wheel element, and a portion of a synthetic resin configuring the outer wheel element may enter into a concave part configuring the concave-convex part.

In a case where the worm wheel of the invention is implemented, for example, the concave-convex part may be provided in the inner surface of the first annular concave part or the second annular concave part.

In this case, for example, the concave-convex part may be provided in the outer diameter side circumferential surface or the inner diameter side circumferential surface configuring the inner surface of the first annular concave part or the second annular concave part.

In this case, for example, the concave-convex part may be provided over the entire axial length of the outer diameter side circumferential surface or the inner diameter side circumferential surface configuring the inner surface of the first annular concave part or the second annular concave part, and a portion of the synthetic resin configuring the outer wheel element may enter into the entire concave part configuring the concave-convex part.

In a case where the worm wheel of the invention is implemented, in a case where the concave-convex part is provided in the outer diameter side circumferential surface or the inner diameter side circumferential surface configuring the inner surface of the first annular concave part or the second annular concave part, for example, a plurality of concave parts and a plurality of convex parts configuring the concave-convex part may be formed in parallel to the axial direction of the worm wheel.

Further, the plurality of teeth configuring the worm wheel tooth part may be formed in the direction which is tilted in a predetermined direction with respect to the axial direction of the worm wheel, and the plurality of concave parts and the plurality of convex parts configuring the concave-convex part may be formed in the direction which is tilted in the opposite direction to the predetermined direction with respect to the axial direction of the worm wheel.

In a case where the worm wheel of the invention is implemented, for example, a sub concave part may be provided to be recessed radially outward in a portion which is positioned on an axial deep side from an axial opening-side end edges of the first annular concave part in the outer diameter side circumferential surface configuring the inner surface of the first annular concave part, and a portion of the synthetic resin configuring the outer wheel element may enter into the sub concave part.

In this case, for example, a cross section of the sub concave part with respect to a virtual plane including the central axis of the inner wheel element may have a V shape such that a width dimension in the axial direction becomes smaller from an opening part on an inner diameter side toward a bottom part on an outer diameter side.

In a case where the worm wheel of the invention is implemented, for example, the inner wheel element may be formed to be a cylindrical surface part in an axial range of at least a portion of the outer circumferential surface.

In a case where the worm wheel of the invention is implemented, in a case where the entire outer circumferential surface of the inner wheel element serves as the cylindrical surface part, for example, the radially outer end parts of both axial surfaces of the inner wheel element, which are continuous (directly or through the chamfered portion) with respect to both axial end edges of the cylindrical surface part which is the outer circumferential surface of the inner wheel element each may serve as flat surface parts orthogonal to the central axis of the inner wheel element. Accordingly, the both axial end edges of the cylindrical surface part which is the outer circumferential surface of the inner wheel element each can be formed to have a circular shape in which the axial position is not changed in the circumferential direction.

In a case where the invention is implemented, for example, in the surface of the inner wheel element, at least one portion (for example, the cylindrical surface part and the entire surface of the inner wheel element) in portions which are covered with the synthetic resin configuring the outer wheel element may serve as a minute concave-convex surface formed by various kinds of processes such as a knurling process, an emboss process (a process to transfer the minute concave-convex formed in the surface of hard metal to the surface of the molded article), and a shot blast.

With such a configuration, a portion of the synthetic resin configuring the outer wheel element enters into the concave part configuring the minute concave-convex surface, and thus it is possible to improve the holding power (adhesiveness) of the outer wheel element with respect to the inner wheel element.

Incidentally, the depth of the concave part configuring the minute concave-convex surface is preferably set to be equal to or less than one tenth (preferably, equal to or less than one twentieth, and more preferably, equal to or less than one thirtieth) of the radial height of the teeth configuring the worm wheel tooth part, so that the volume of the synthetic resin configuring the outer wheel element is hardly affected.

In a case where the worm wheel of the invention is implemented, for example, a projecting part which projects on the axial other side from a portion adjacent to the radially outer side may be provided in a radially inner end part (for example, the same radial position as the radially inner end part of the second annular concave part in the axial other-side surface of the outer wheel element) of an axial other-side surface of the outer wheel element.

A worm reduction gear of the invention includes a housing, a rotation shaft, a worm wheel, and a worm shaft.

The rotation shaft is supported to be rotatable with respect to the housing.

Further, the worm wheel has a worm wheel tooth part in an outer circumferential surface and is externally fitted and fixed to the rotation shaft.

Further, the worm shaft has a worm tooth part in an axial intermediate portion of an outer circumferential surface and is supported to be rotatable with respect to the housing in a state where the worm tooth part is engaged with the worm wheel tooth part.

Particularly, in the case of the worm reduction gear of the invention, the worm wheel is the worm wheel of the invention.

In a case where the worm reduction gear of the invention is implemented, for example, the outer circumferential surface of the inner wheel element configuring the worm wheel may be formed to be a cylindrical surface part in an axial range which is radially superimposed with at least an axial portion (for example, an axial intermediate portion or an axial end part) of an engaging portion of the worm wheel tooth part and the worm tooth part.

In this case, for example, the outer circumferential surface of the inner wheel element may be formed to be the cylindrical surface part in an axial range which is radially superimposed with the entire engaging portion.

Further, in this case, for example, the entire outer circumferential surface (excluding the chamfered portion in a case where the chamfered portion is provided in the axial end edge part of the outer circumferential surface) of the inner wheel element may serve as the cylindrical surface part.

In a case where the worm reduction gear of the invention is implemented, for example, a rolling bearing which includes an inner ring, an outer ring, and a plurality of rolling bodies provided between an outer circumferential surface of the inner ring and an inner circumferential surface of the outer ring, and supports the rotation shaft to be rotatable with respect to the housing may be provided in a portion adjacent to an axial other side of the worm wheel.

Further, an axial other-side surface of the outer wheel element configuring the worm wheel may face an axial one-side surface of the inner ring and an axial one-side surface of the outer ring in the axial direction.

Further, an axial distance between the axial other-side surface of the outer wheel element and the axial one-side surface of the inner ring may be smaller than an axial distance between the axial other-side surface of the outer wheel element and the axial one-side surface of the outer ring.

In a case where the worm reduction gear of the invention is implemented, for example, a projecting part which projects on the axial other side from a portion adjacent to the radially outer side may be provided in a radially inner end part of the axial other-side surface of the outer wheel element configuring the worm wheel, and an axial other-side surface of the projecting part may face the axial one-side surface of the inner ring in the axial direction.

To put this in another manner, in the axial other-side surface of the outer wheel element, the projecting part which projects on the axial other side from the portion which faces the axial one-side surface of the outer ring in the axial direction may be provided in the portion which faces the axial one-side surface of the inner ring in the axial direction.

A manufacturing method of the worm wheel of the invention is a manufacturing method for the worm wheel of the invention.

In the manufacturing method of the worm wheel of the invention, a radially outer end part of a disc gate may be positioned in the radially inner end part of the axial other side of the outer wheel element when an insertion molding is performed in which the outer wheel element is coupled with the inner wheel element at the same time when the outer wheel element is manufactured by the injection molding.

Advantages of the Invention

With the worm wheel, the worm reduction gear, and the manufacturing method of the worm wheel according to the above-described invention, it is possible to improve the holding power of the synthetic resin outer wheel element with respect to the inner wheel element.

BRIEF DESCRIPTION OF THE DRAWINGS

FIGS. 14A and 14B are views of a cut-away half portion of a worm wheel according to the seventh embodiment when viewed from a radial direction.

MODES FOR CARRYING OUT THE INVENTION

First Embodiment

A first embodiment of the invention will be described with reference to FIGS. 1 to 7.

Figure 1:
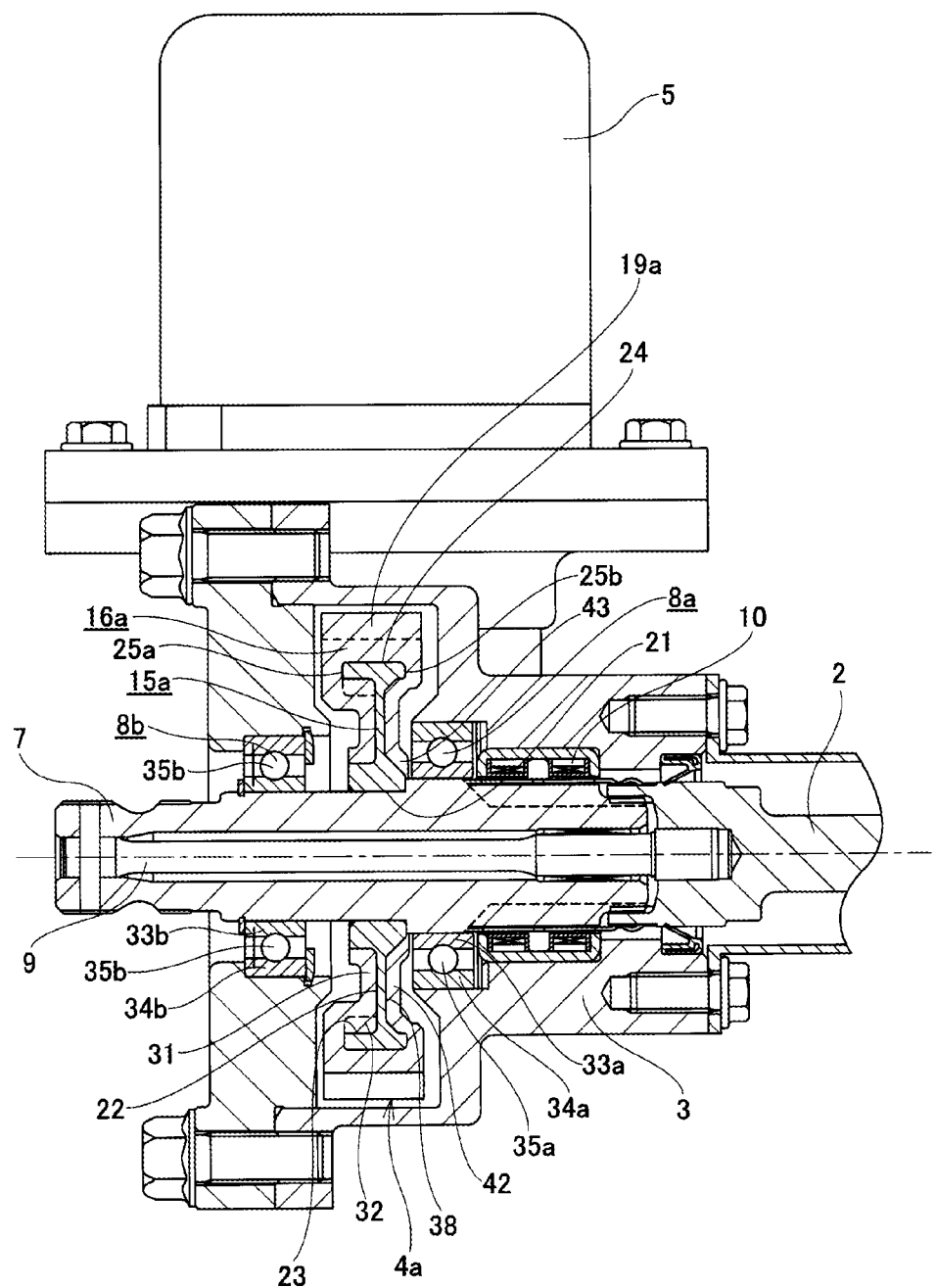
FIG. 1 is a sectional view similar with FIG. 22 according to a first embodiment of the invention.
Figure 20:
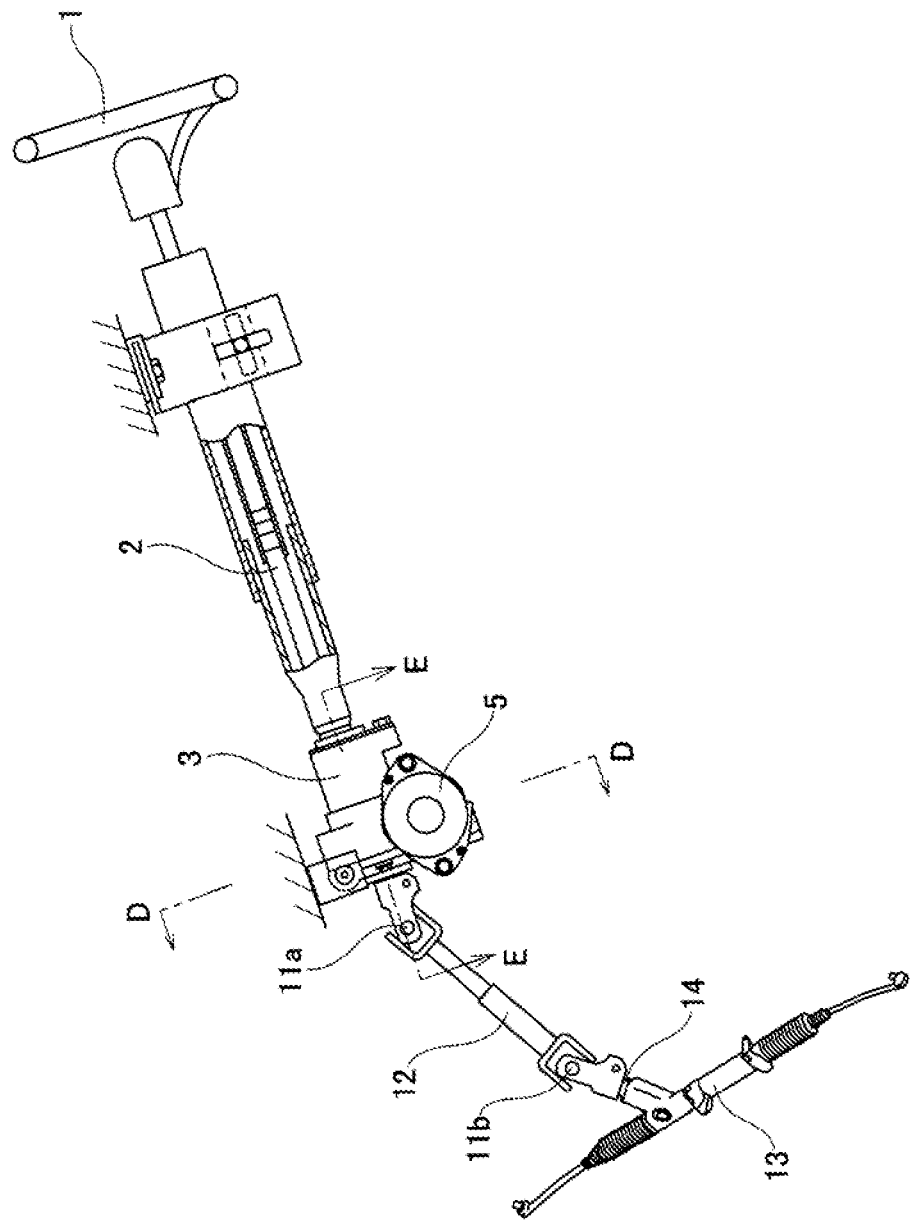
FIG. 20 is a side view illustrating one example of a structure of the electric power steering device in the related art partially cut away.
Figure 21:
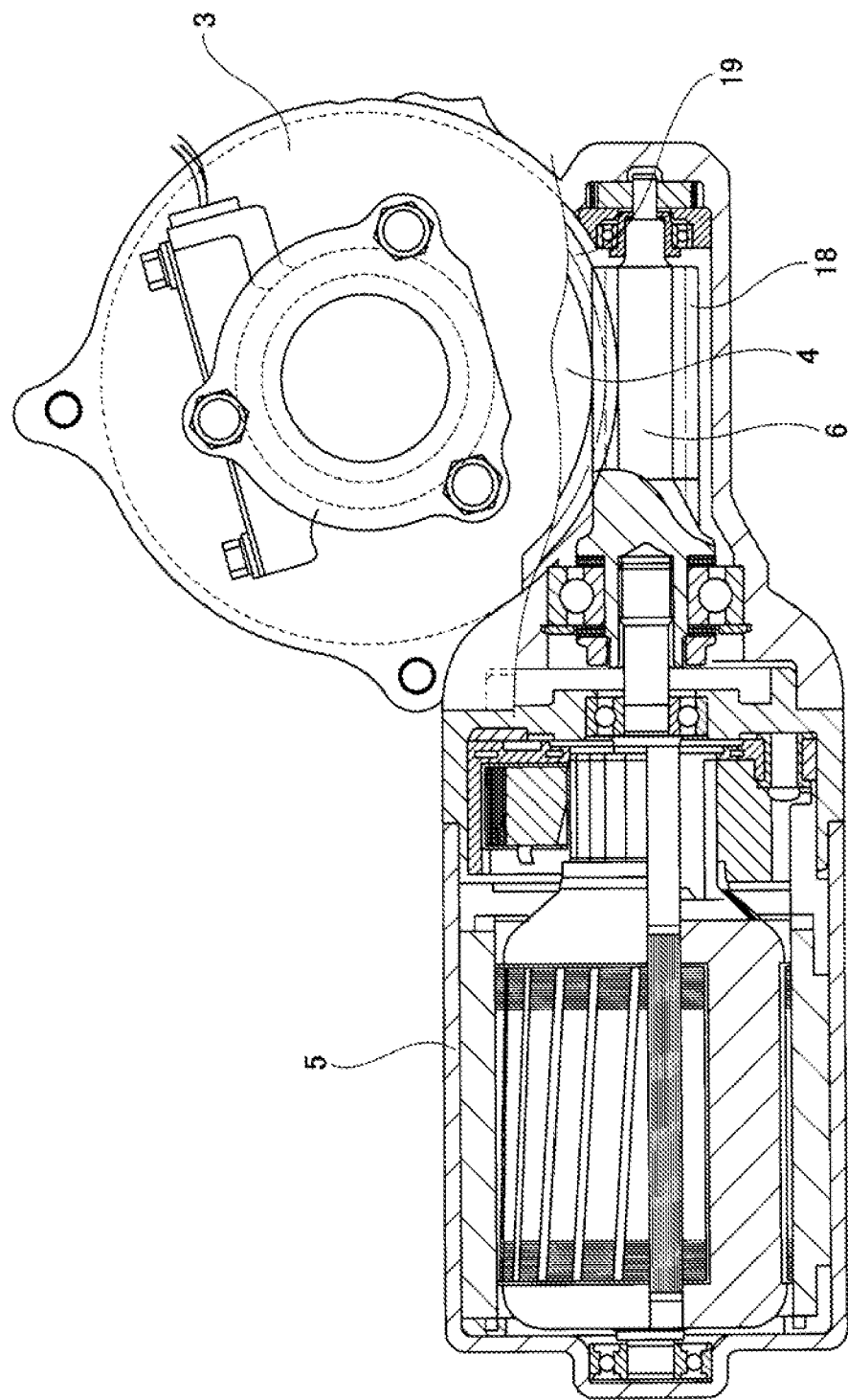
FIG. 21 is an enlarged sectional view taken along line D-D of FIG. 20.
Figure 22:
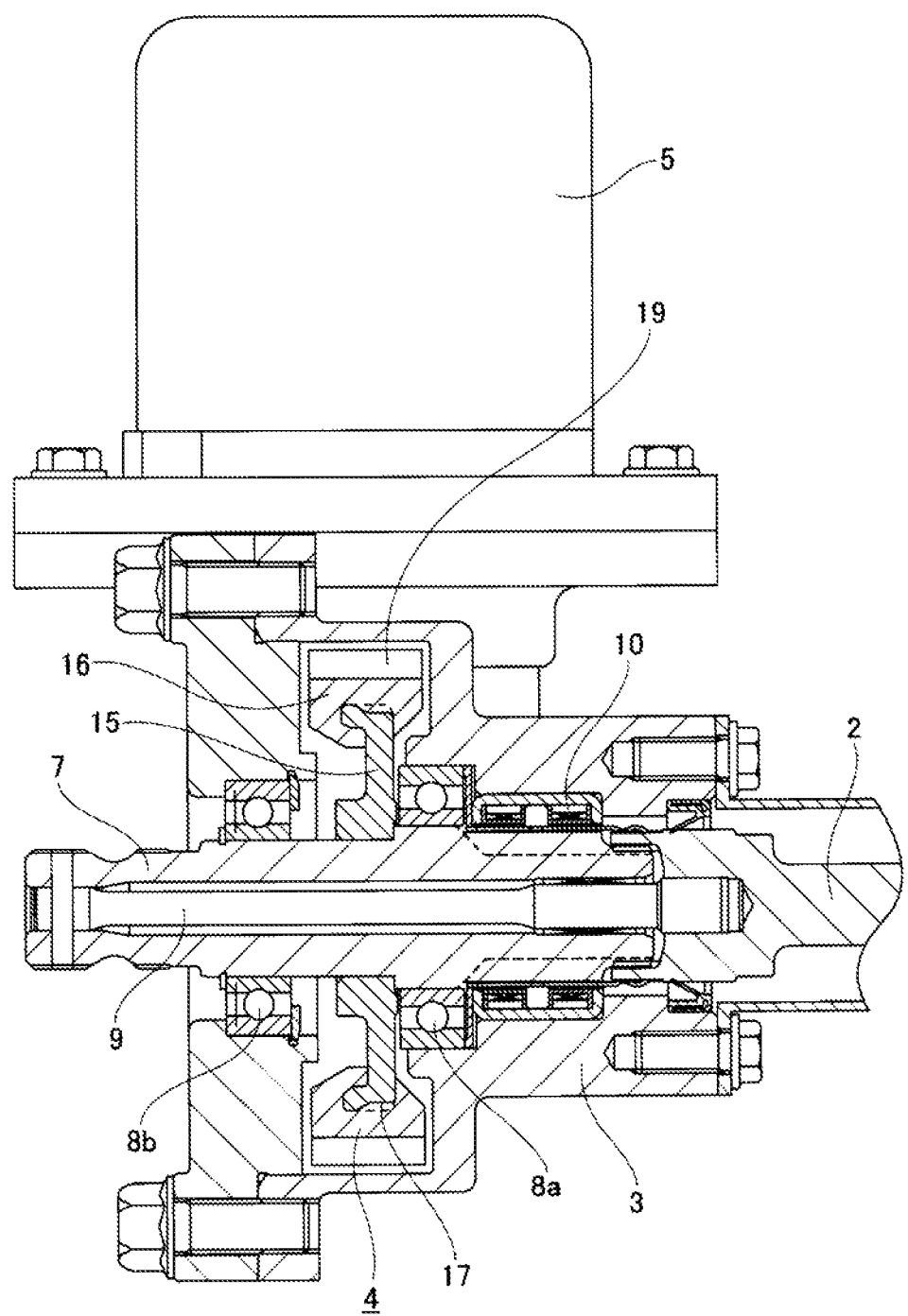
FIG. 22 is an enlarged sectional view taken along line E-E of FIG. 20.
Figure 23:
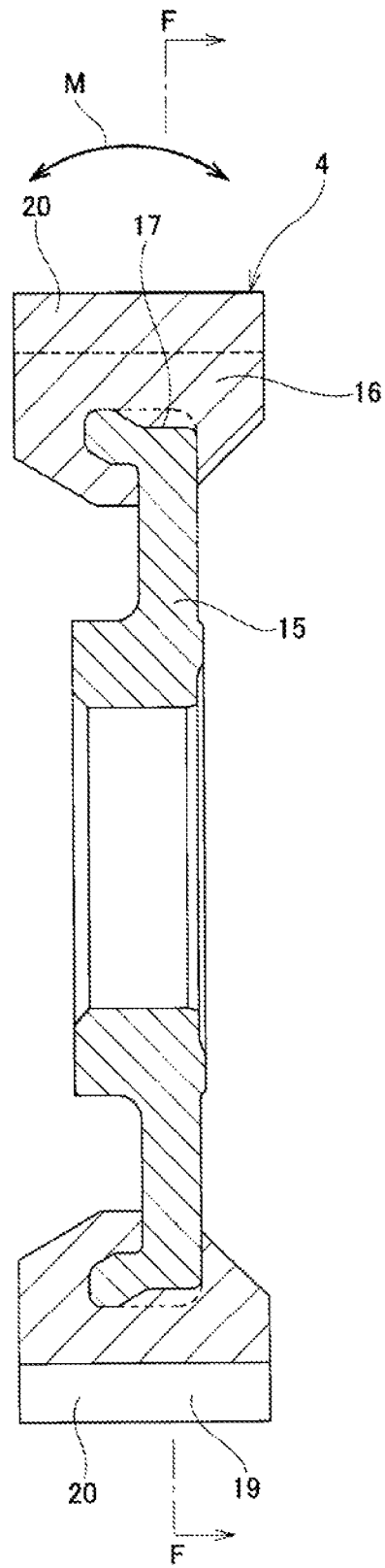
FIG. 23 is a sectional view of the worm wheel.
Figure 24:
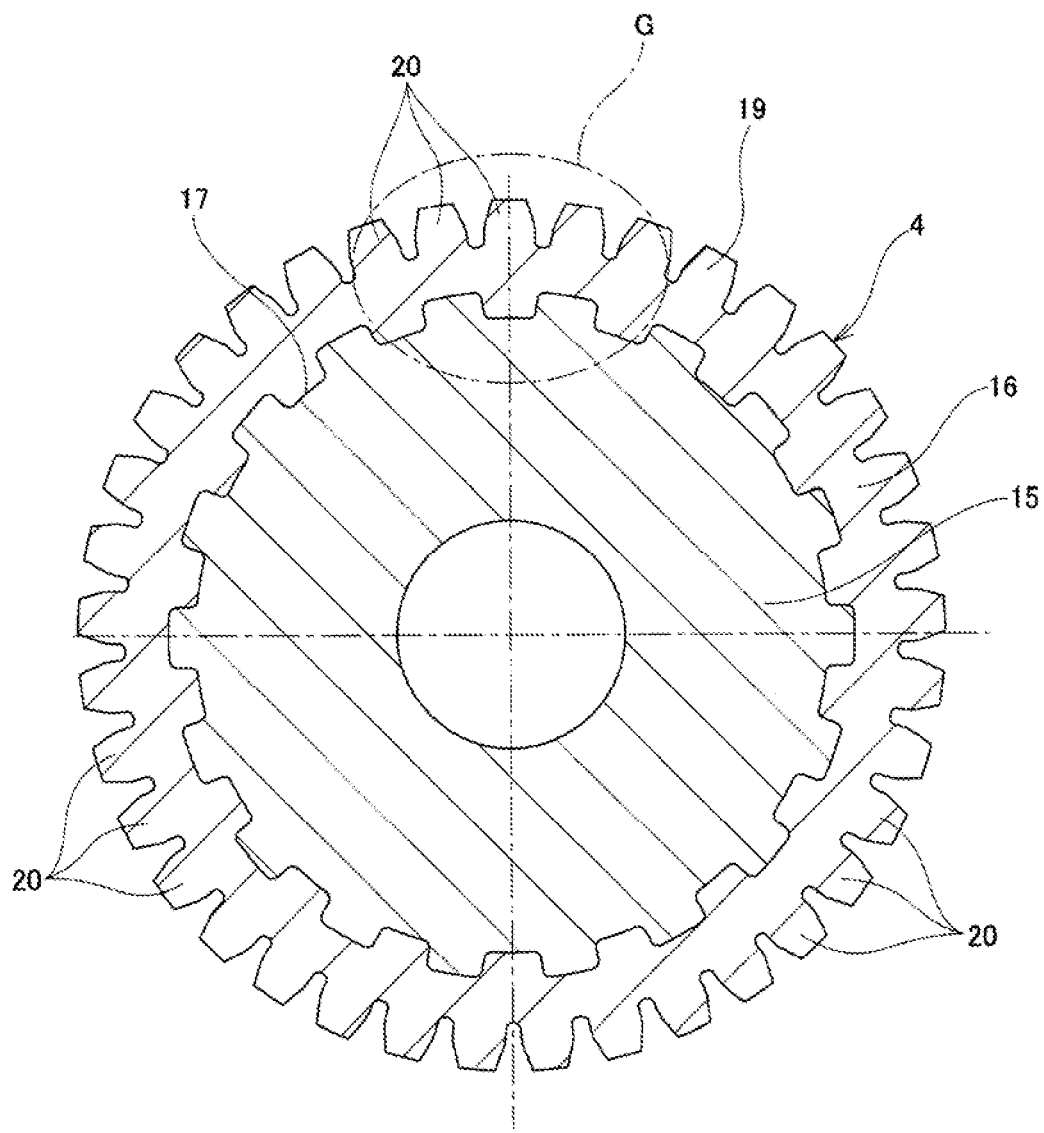
FIG. 24 is a sectional view taken along line F-F of FIG. 23.
Figure 25:
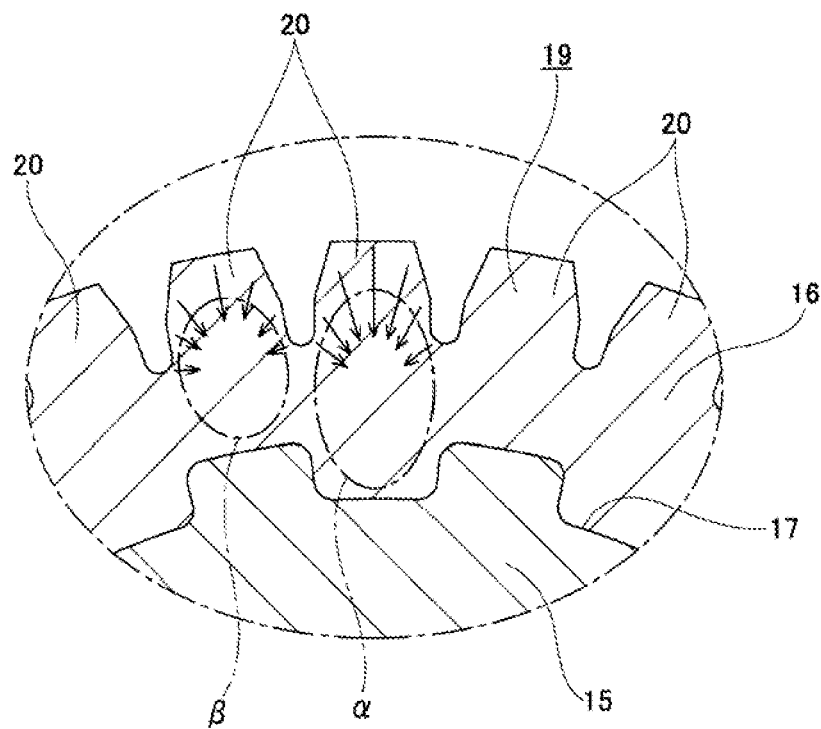
FIG. 25 is an enlarged view of G portion of FIG. 24.

FIG. 1 illustrates an electric power steering device in which a worm reduction gear of this embodiment is assembled. A front end part of a steering shaft 2 in which a steering wheel 1 (see FIG. 20) is attached to a rear end part is supported to be rotatable in a housing 3. A worm wheel 4a is fixed to a portion rotationally driven by the steering shaft 2. On the other hand, a worm shaft 6 (see FIGS. 3 and 21) is connected to an output shaft of an electric motor 5. Further, a worm tooth part 18 provided in the outer circumferential surface of the axial intermediate portion of the worm shaft 6 is engaged with a worm wheel tooth part 19a provided in the outer circumferential surface of the worm wheel 4a, so that a predetermined magnitude of auxiliary torque (auxiliary power) can be applied from the electric motor 5 with respect to the worm wheel 4a in the predetermined direction.

The worm wheel 4a is externally fitted and fixed to an axial intermediate portion of an output shaft 7 which corresponds to a rotation shaft and serves as an output part of the auxiliary torque, and rotates together with the output shaft 7. The output shaft 7 is coupled with the front end part of the steering shaft 2 through a torsion bar 9 in the housing 3 in a state where a portion near both ends of the axial intermediate portion is supported to be rotatable by one pair of rolling bearings 8a and 8b. The electric motor 5 rotationally drives the worm shaft 6 according to a direction and a magnitude of a steering torque which is detected by a torque sensor 10 and is applied from the steering wheel 1 to the steering shaft 2, and the auxiliary torque is applied to the output shaft 7. The rotation of the output shaft 7 is transmitted to a pinion shaft 14 (see FIG. 20) which serves as an input part of a steering gear unit 13 through one pair of universal joints 11a and 11b and an intermediate shaft 12, and a desired steering angle is given to a steering wheel.

Incidentally, in the case of the illustrated example, one pair of the rolling bearings 8a and 8b are ball bearings which include inner rings 33a and 33b which are externally fitted to and supported by the output shaft 7, outer rings 34a and 34b internally fitted to and supported by the housing 3, and a plurality of balls 35a and 35b which each are a rolling body and are provided to be rollable between an inner ring raceway provided in the outer circumferential surface of the inner rings 33a and 33b and an outer ring raceway provided in the inner circumferential surface of the outer rings 34a and 34b, respectively. Herein, in a case where the invention is implemented, another kind of rolling bearing such as a cylindrical roller bearing or a tapered roller bearing also may be adopted as one pair of rolling bearings 8a and 8b.

The worm wheel 4a is formed by combining an inner wheel element 15a and an outer wheel element 16a.

The inner wheel element 15a is formed of metal in an annular shape (substantially circular ring shape), and a fitting hole 21 for internally fitting and fixing the axial intermediate portion of the output shaft 7 in a torque-transmittable manner is included in a radial intermediate portion.

A first annular concave part 22 is provided to be recessed in an axial direction over the entire circumference of a radial intermediate portion of an axial one-side surface (the left surface in FIGS. 1 to 4 and 7) of the inner wheel element 15a.

In an inner diameter side circumferential surface, an outer diameter side circumferential surface, and a bottom surface (axial one-side surface) configuring the inner surface of the first annular concave part 22, the outer diameter side circumferential surface is provided with a (gear-shaped) concave-convex part 23 in the circumferential direction which is formed in such a manner that a concave part 26 and a convex part 27 are arranged alternately (to have constant pitch in the illustrated example) in the circumferential direction in the entire length and the entire circumference of the outer diameter side circumferential surface in an axial direction. In the case of this embodiment, as illustrated by a broken line (hidden line) in an upper half portion in FIG. 4, a plurality of the concave parts 26 and a plurality of the convex parts 27 configuring the concave-convex part 23 are formed in parallel to the axial direction (a right and left direction in FIGS. 1 to 4 and 7) of the inner wheel element 15a (worm wheel 4a). To put this in another manner, the boundary between the concave part 26 and the convex part 27 is formed in parallel to the axial direction of the worm wheel 4a.

Further, the inner diameter side circumferential surface which configures the inner surface of the first annular concave part 22 serves as a cylindrical surface part 36 having a simple cylindrical surface shape.

Further, the bottom surface which configures the inner surface of the first annular concave part 22 serves as an intermediate flat surface part 37a which is orthogonal to a central axis of the inner wheel element 15a and has a circular ring shape.

A second annular concave part 38 is provided to be recessed in the axial direction over the entire circumference of the radial intermediate portion of the axial other-side surface (the right surface in FIGS. 1 to 4 and 7) of the inner wheel element 15a.

In the inner diameter side circumferential surface, the outer diameter side circumferential surface, and the bottom surface (axial other-side surface) configuring the inner surface of the second annular concave part 38, the outer diameter side circumferential surface is formed such that respective axial end edges of an outer diameter side tilted surface part 39 provided in one side (an one side portion and an intermediate portion) and an outer diameter side cylindrical surface part 40 provided in the other side (other end portion) are continuous to each other in the axial direction. The outer diameter side tilted surface part 39 corresponds to a tilted surface part, and is formed in a partially tapered surface shape that is tilted in a direction (the direction toward the radially outer side) in which a radial width dimension of the second annular concave part 38 is larger toward the axial other side with respect to the central axis of the inner wheel element 15a. With respect thereto, the outer diameter side cylindrical surface part 40 corresponds to a non-tilted surface part, and is formed in a simple cylindrical surface shape not to be tilted with respect to the central axis of the inner wheel element 15a.

Further, the inner diameter side circumferential surface configuring the inner surface of the second annular concave part 38 is configured only by an inner diameter side tilted surface part 41. The inner diameter side tilted surface part 41 corresponds to the tilted surface part, and is formed in a partially tapered surface shape that is tilted in a direction (the direction toward the radially inner side) in which the radial width dimension of the second annular concave part 38 is larger toward the axial other side with respect to the central axis of the inner wheel element 15a.

Further, the bottom surface configuring the inner surface of the second annular concave part 38 serves as an intermediate flat surface part 37b of the circular ring shape which is orthogonal to the central axis of the inner wheel element 15a.

In the inner wheel element 15a, the entire outer circumferential surface (excluding chamfered portions thereof in a case where the chamfered portions are provided in both axial end edge parts) serves as a cylindrical surface part 24 in which a radial distance from the central axis of the inner wheel element 15a is not substantially changed over the entire circumference. In the case of this embodiment, the cylindrical surface part 24 is formed in a simple cylindrical surface shape which has a bus line parallel to the central axis of the inner wheel element 15a (worm wheel 4a) and has a diameter which is not changed in the axial direction. Further, the radially outer end part (the portion positioned on the radially outer side from the first annular concave part 22) of the axial one-side surface of the inner wheel element 15a and the radially outer end part (the portion positioned on the radially outer side from the second annular concave part 38) of the axial other-side surface of the inner wheel element 15a are continuous (directly or through the chamfered portion) with respect to both axial end edges of the cylindrical surface part 24 and serve as flat surface parts 25a and 25b which have a circular ring shape and are orthogonal to the central axis of the inner wheel element 15a, respectively.

To put this in another manner, in the case of this embodiment, the inner wheel element 15a includes an inner diameter side annular part 28 and an outer diameter side annular part 29 which are arranged coaxially with each other, and a connection part 30 which has a circular ring shape and connects the axial intermediate portions of the outer circumferential surface of the inner diameter side annular part 28 and the inner circumferential surface of the outer diameter side annular part 29. Further, the outer circumferential surface of the outer diameter side annular part 29 serves as the cylindrical surface part 24, and both axial surfaces of the outer diameter side annular part 29 serve as the flat surface parts 25a and 25b. Further, the portion surrounded by three sides of the axial one end portion of the outer circumferential surface of the inner diameter side annular part 28, the axial one end portion of the inner circumferential surface of the outer diameter side annular part 29, and the axial one-side surface of the connection part 30 serves as the first annular concave part 22. The portion surrounded by three sides of the axial other end portion of the outer circumferential surface of the inner diameter side annular part 28, the axial other end portion of the inner circumferential surface of the outer diameter side annular part 29, and the axial other-side surface of the connection part 30 serves as the second annular concave part 38. Further, in the inner circumferential surface of the outer diameter side annular part 29, the axial one end portion serves as the concave-convex part 23, and the axial other end portion serves as the outer diameter side tilted surface part 39 and the outer diameter side cylindrical surface part 40. Further, in the outer circumferential surface of the inner diameter side annular part 28, the axial one end portion serves as the cylindrical surface part 36, and the axial other end portion serves as the inner diameter side tilted surface part 41.

Incidentally, various kinds of metals such as copper alloy, aluminum alloy, and magnesium alloy in addition to ferrous metal such as iron and steel may be adopted as a metal configuring the inner wheel element 15a. Further, various kinds of cutting processes or plastic processes can be adopted as a process to mold the inner wheel element 15a. Herein, the plastic process (forging, pressing, flow forming, and the like) is preferably adopted when molded in a high yield at low cost.

On the other hand, since the outer wheel element 16a is manufactured by injection-molding a synthetic resin, a portion of the inner wheel element 15a is embedded over the entire circumference through the injection molding (insertion molding). Specifically, one portion (the radially outer end part and the intermediate portion) of the inner wheel element 15a is embedded in the outer wheel element 16a, such that the continuous range from the inner diameter side circumferential surface (cylindrical surface part 36) configuring the inner surface of the first annular concave part 22, through the outer circumferential surface (cylindrical surface part 24) of the inner wheel element 15a, to the inner diameter side circumferential surface (inner diameter side tilted surface part 41) configuring the inner surface of the second annular concave part 38 in the surface of the inner wheel element 15a is covered over the entire circumference.

In this state, a portion of the synthetic resin enters into the first annular concave part 22 and the second annular concave part 38. Thus, the portion entering into the first annular concave part 22 configures a first suppression part 31 having an annular shape and the portion entering into the second annular concave part 38 configures a second suppression part 42 having an annular shape. Further, in this state, a portion of the synthetic resin configuring the first suppression part 31 enters into the entire portion of the plurality of concave parts 26 and 26 configuring the concave-convex part 23 (the portion between the convex parts 27 and 27 adjacent in the circumferential direction), so as to cover the entire surface of the concave-convex part 23. Thus, a rotation holding part 32 is configured to be engaged with the concave-convex part 23 (have a shape coinciding with the concave-convex part 23). Further, the thickness (excluding the thickness of the portion entering into the plurality of concave parts 26 and 26) of the first suppression part 31 is wholly almost the same, and the thickness of the second suppression part 42 also is wholly almost the same. Further, in the axial other-side surface of the outer wheel element 16a, the projecting part 43 is provided over the entire circumference in a radial position which is the same as the radially inner end part of the second annular concave part 38 in the state of projecting from the inside (the axial other-side surface of the second suppression part 42) of the second annular concave part 38 to the axial other side.

The worm wheel tooth part 19a is formed in the outer circumferential surface of the outer wheel element 16a. The axial intermediate portion of the worm wheel tooth part 19a is radially superimposed with the cylindrical surface part 24. Further, as illustrated in the upper half portion of FIG. 4, the direction of forming the plurality of teeth configuring the worm wheel tooth part 19a is tilted with respect to the axial direction of the worm wheel 4a. Further, in the case of this embodiment, a tooth tip circle diameter and a tooth bottom circle diameter of the worm wheel tooth part 19a are not changed with respect to the axial direction, respectively.

Figure 7:
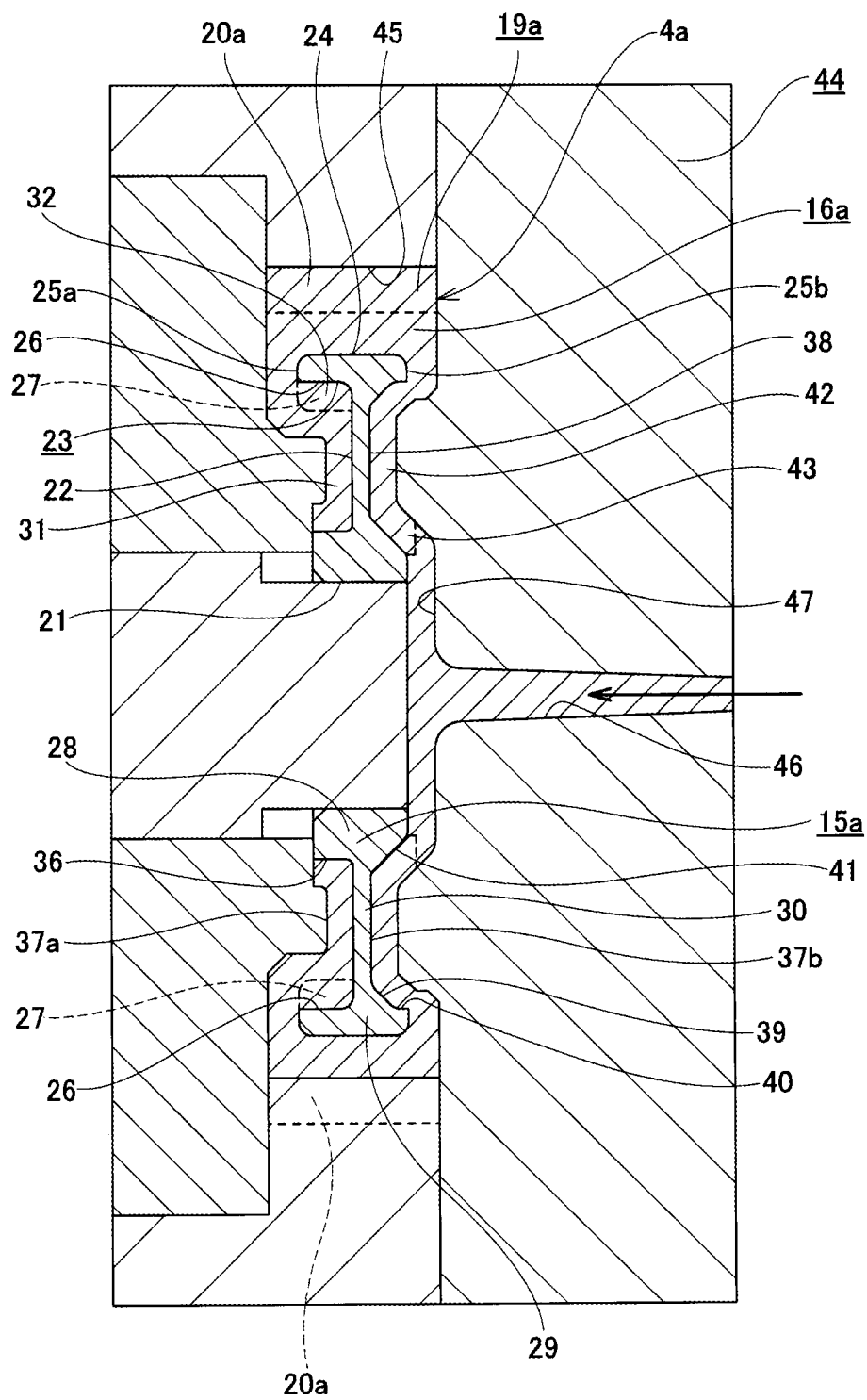
FIG. 7 is a sectional view illustrating a state where an outer wheel element is injection-molded according to the first embodiment.

In the case of this embodiment, at the same time when the outer wheel element 16a is manufactured by the injection molding, when the insertion molding is performed in which the outer wheel element 16a is coupled with respect to the inner wheel element 15a, as illustrated in FIG. 7, in a state where the inner wheel element 15a is set in a molding device 44 formed by combining a plurality of dies, molten resin is fed into an annular cavity 45 which is defined between the inner wheel element 15a and the molding device 44 from a runner 46 and a disc gate 47 which are provided in the axial other-side surface side of the inner wheel element 15a. In the cavity 45, the radially outer end part (outer circumferential part) of the disc gate 47 is positioned in a portion in which the radially inner end part (projecting part 43) of the axial other side of the outer wheel element 16a is formed, and the runner 46 is provided to extend from the central portion of the disc gate 47 to the axial other side. The molten resin fed into the cavity 45 from the runner 46 and the disc gate 47 flows from the inner diameter side to the outer diameter side along the axial other-side surface of the inner wheel element 15a, and part thereof enters into the second annular concave part 38. At that time, in the case of this embodiment, the inner diameter side tilted surface part 41 and the outer diameter side tilted surface part 39 are provided in the inner diameter side circumferential surface and the outer diameter side circumferential surface configuring the inner surface of the second annular concave part 38. Thus, without large disturbance to the flow, the molten resin enters into the portion in which the radially outer end part of the outer wheel element 16a in the cavity 45 is formed. Further, the molten resin fed into the cavity 45 reaches a portion corresponding to the first suppression part 31 and stops. The portion does not abut on the molten resin having flowed from the other direction. As a result, it can be prevented that weld or the like which is weak in strength occurs in the outer wheel element 16a obtained by the injection molding. The molding device 44 is opened and the plurality of dies are separated from each other. Then, the synthetic resin which is cooled and solidified in the cavity 45 is cut over the entire circumference in the portion corresponding to the radially inner end part of the axial other side of the outer wheel element 16a, and the worm wheel 4a is obtained by performing a finishing process as needed. Incidentally, at that time, in the case of this embodiment, a portion (the portion to be removed originally) of the synthetic resin positioned in the radially outer end part of the disc gate 47 remains without removal, to form the projecting part 43. Accordingly, a yield is excellent, and the projecting part 43 can be formed at low cost.

Incidentally, in addition to a polyamide 66 (PA66), various kinds of synthetic resins such as the polyamide 46 (PA46), a polyamide 9T (PA9T), a polyphenylene sulfide (PPS), a polyethylene terephthalate (PET), and a polyacetal (POM) may be adopted as a synthetic resin configuring the outer wheel element 16a. Further, as needed, various kinds of reinforced fibers such as a glass fiber, a polyethylene fiber, a carbon fiber, and an aramid fiber may be mixed in the synthetic resin.

Further, in a state where the electric power steering device of this embodiment is assembled, at least an axial portion in the engaging portion 50 (the portion indicated by crosshatched pattern in FIG. 3) of the worm tooth part 18 and the worm wheel tooth part 19a is configured to be radially superimposed with the cylindrical surface part 24 provided in the outer circumferential surface of the inner wheel element 15a.

Particularly, in the case of this embodiment, the entire engaging portion 50 is configured to be radially superimposed with the cylindrical surface part 24. For this reason, the axial width dimension S of the engaging portion 50 is set to be equal to or less than an axial width dimension T (S≤T(S<T in the example illustrated in FIG. 3)) of the cylindrical surface part 24. The axial range positioned in the engaging portion 50 is within the axial range positioned in the cylindrical surface part 24.

Herein, in a case where the invention is implemented, for example, the axial width dimension S of the engaging portion 50 is set to be larger than the axial width dimension T of the cylindrical surface part 24 (S>T), and the axial range positioned in the cylindrical surface part 24 may be configured to be within the axial range positioned in the engaging portion 50.

In a state where the electric power steering device of this embodiment is assembled, the axial other-side surface of the outer wheel element 16a and the axial one-side surface of the inner ring 33a and the axial one-side surface of the outer ring 34a which are provided in the portion adjacent to the axial other side of the worm wheel 4a and configure the rolling bearing 8a, face each other in the axial direction through a gap. Specifically, in the axial other-side surface of the outer wheel element 16a, the portion corresponding to the projecting part 43 faces the axial one-side surface of the inner ring 33a in the axial direction, and the portion corresponding to the radial intermediate portion of the second suppression part 42 faces the axial one-side surface of the outer ring 34a in the axial direction. Herein, in the case of this embodiment, the axial one-side surface of the inner ring 33a and the axial one-side surface of the outer ring 34a are provided in almost the same position in the axial direction while in the axial other-side surface of the outer wheel element 16a, the portion (the axial other-side surface of the projecting part 43) corresponding to the projecting part 43 is positioned on the axial other side (by at least an axial dimension of the projecting part 43) from the portion (the axial other-side surface of the radial intermediate portion of the second suppression part 42) corresponding to the radial intermediate portion of the second suppression part 42. For this reason, an axial distance X between the axial other-side surface (the axial other-side surface of the projecting part 43) of the outer wheel element 16a and the axial one-side surface of the inner ring 33a is smaller than the axial distance Y between the axial other-side surface (the axial other-side surface of the radial intermediate portion of the second suppression part 42) of the outer wheel element 16a and the axial one-side surface of the outer ring 34a (X<Y).

In the worm wheel 4a and the worm reduction gear of this embodiment configured as above, the holding power of the synthetic resin outer wheel element 16a can be secured from the metal inner wheel element 15a, and the manufacturing error can be suppressed in the worm wheel tooth part 19a provided in the outer circumferential surface of the outer wheel element 16a. The description will be given below about these points.

Figure 2:
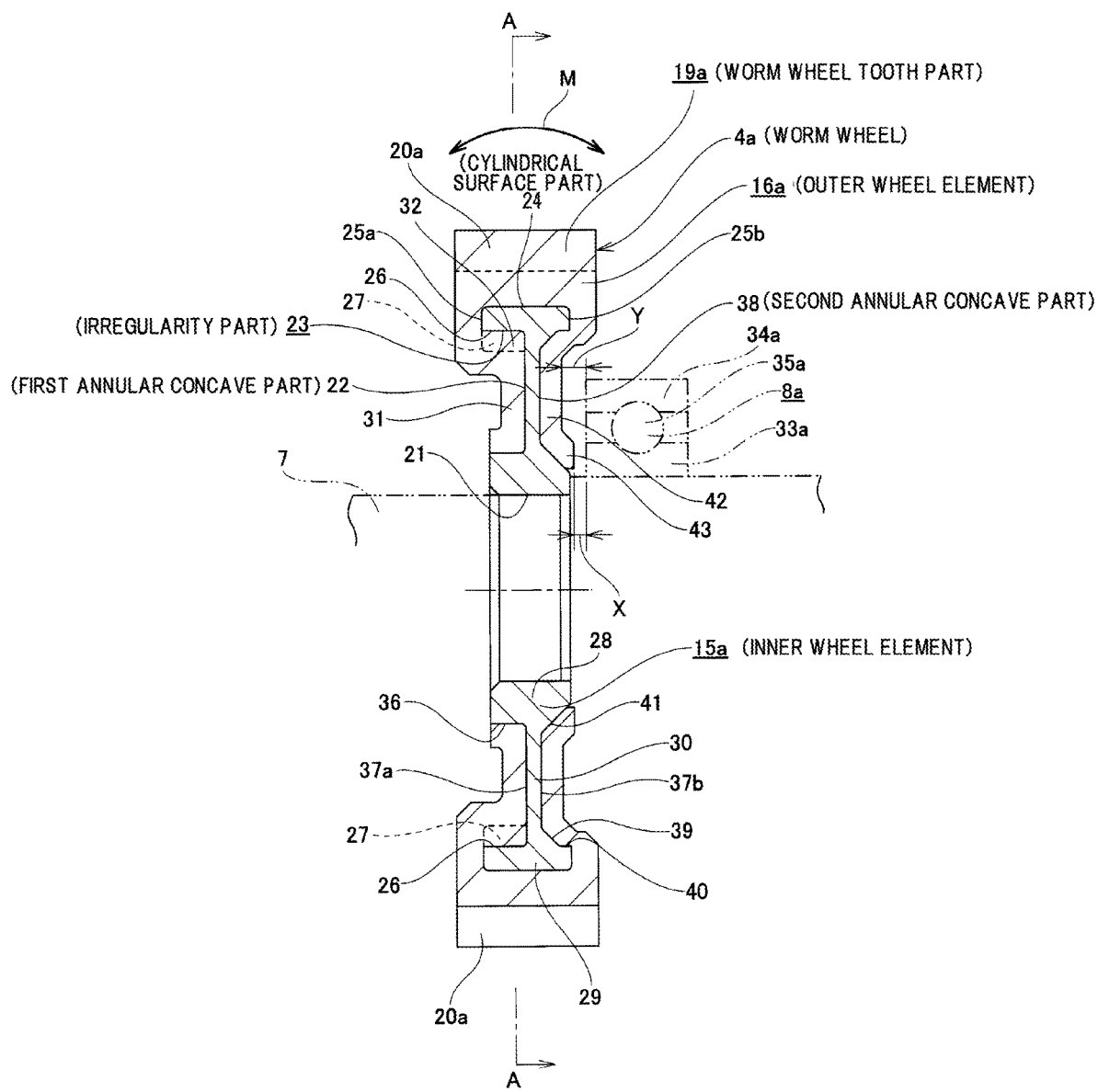
FIG. 2 is a sectional view of a worm wheel according to the first embodiment.
Figure 3:
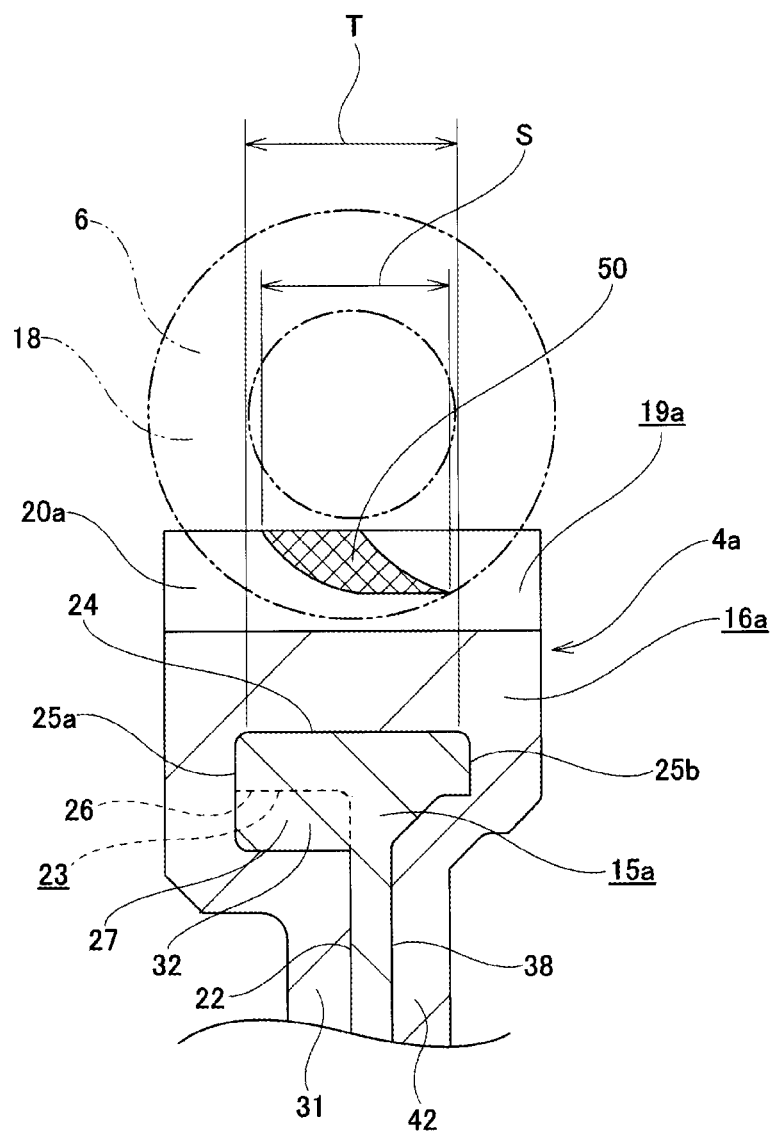
FIG. 3 is a sectional view partially illustrating a state where a worm tooth part is engaged with a worm wheel tooth part according to the first embodiment.
Figure 4:
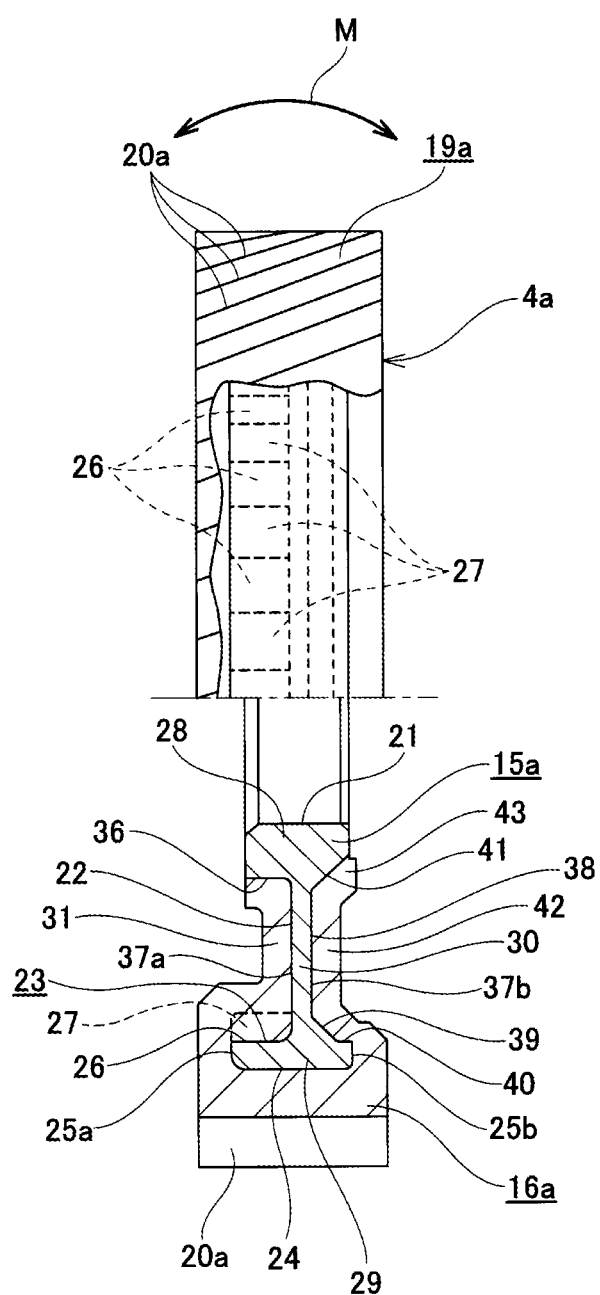
FIG. 4 is a half-sectional view of the worm wheel according to the first embodiment when partially cut away.
Figure 5:
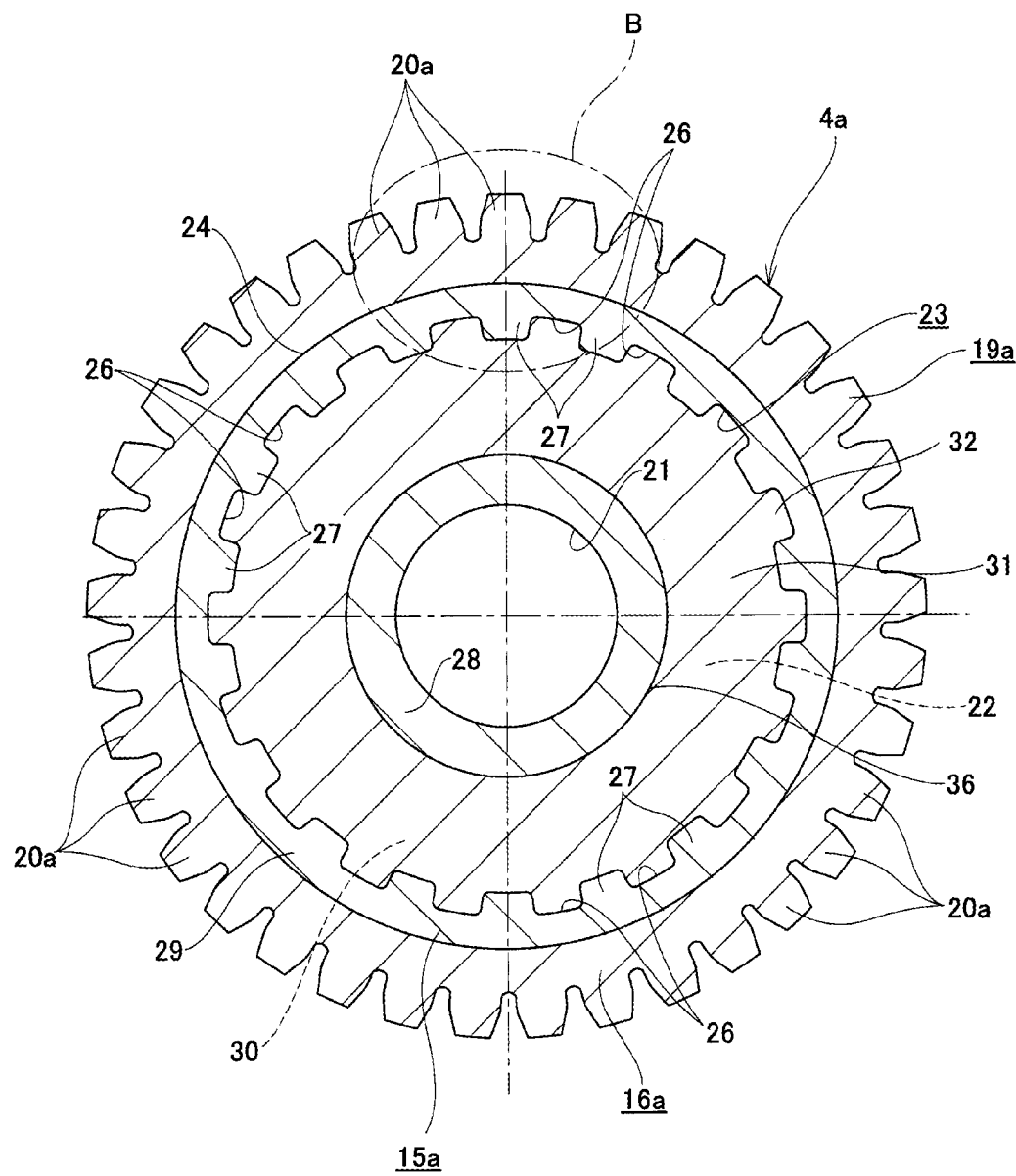
FIG. 5 is a sectional view taken along line A-A of FIG. 2 according to the first embodiment.

When the auxiliary torque is applied to the output shaft 7 through the worm wheel 4a, the moment M in a tilted direction is applied to the worm wheel 4a as illustrated by an arrow in FIG. 2 on the basis of an axial component of an engaging counterforce which acts on the engaging portion of the worm wheel tooth part 19a of the worm wheel 4a and the worm tooth part 18 of the worm shaft 6.

With respect thereto, in the case of this embodiment, the first annular concave part 22 and the second annular concave part 38 are provided over the entire circumferences in both axial surfaces of the inner wheel element 15a, respectively. Further, a portion of the inner wheel element 15a is embedded in the outer wheel element 16a, such that the range which is continuous from the inner diameter side circumferential surface (cylindrical surface part 36) configuring the inner surface of the first annular concave part 22 through the outer circumferential surface (cylindrical surface part 24) of the inner wheel element 15a to the inner diameter side circumferential surface (inner diameter side tilted surface part 41) configuring the inner surface of the second annular concave part 38 in the surface of the inner wheel element 15a is covered over the entire circumference. That is, in the case of this embodiment, the radial intermediate portion in the inner wheel element 15a as well as the radially outer end part is embedded in the outer wheel element 16a. For this reason, the holding power of the outer wheel element 16a in the direction of the moment M with respect to the inner wheel element 15a can be larger compared to a case where only the radially outer end part is embedded.

Further, in the case of this embodiment, a portion of the synthetic resin configuring the outer wheel element 16a enters into the first annular concave part 22 to configure the first suppression part 31 having an annular shape, and enters into the second annular concave part 38 to configure the second suppression part 42 having an annular shape. For this reason, the holding power of the outer wheel element 16a in the direction of the moment M with respect to the inner wheel element 15a can be enlarged on the basis of the engagement of the first annular concave part 22 and the first suppression part 31 and the engagement of the second annular concave part 38 and the second suppression part 42.

In the case of this embodiment, the outer diameter side cylindrical surface part 40 is provided in the axial other end portion of the outer diameter side circumferential surface configuring the inner surface of the second annular concave part 38. For this reason, the engaging power of the second annular concave part 38 and the second suppression part 42 with respect to the moment M can be enlarged compared to a case where the entire outer diameter side circumferential surface serves as the outer diameter side tilted surface part 39 (the outer diameter side cylindrical surface part 40 is not provided). As a result, it is possible to enlarge the holding power of the outer wheel element 16a in the direction of the moment M with respect to the inner wheel element 15a.

In the case of this embodiment, the concave-convex part 23 in the circumferential direction is provided in the outer diameter side circumferential surface configuring the inner surface of the first annular concave part 22, and a portion of the synthetic resin configuring the first suppression part 31 enters into the plurality of the entire concave parts 26 and 26 configuring the concave-convex part 23 to cover the entire surface of the concave-convex part 23, thereby configuring the rotation holding part 32 which is engaged with the concave-convex part 23 (has a shape coinciding with the concave-convex part 23). For this reason, in the case of this embodiment, it is possible to secure the holding power of the outer wheel element 16a in the rotation direction with respect to the inner wheel element 15a. Particularly, in the case of this embodiment, the concave-convex part 23 is provided over the entire axial length of the outer diameter side circumferential surface configuring the inner surface of the first annular concave part 22, and thus the holding power in the rotation direction can be large.

The outer circumferential surface of the inner wheel element 15a serves as the cylindrical surface part 24 in which the diameter in the axial direction is not changed. For this reason, in the outer wheel element 16a, the portion which is superimposed on the radially outer side with respect to the cylindrical surface part 24 which is the outer circumferential surface of the inner wheel element 15a has the (substantially) same radial thickness in the portions where the plurality of teeth 20a and 20a configuring the worm wheel tooth part 19a are positioned.

The tooth tip circle diameter and the tooth bottom circle diameter of the worm wheel tooth part 19a provided in the outer circumferential surface of the outer wheel element 16a is not changed in the axial direction, respectively. Together with this, the radially outer end parts of the both axial surfaces of the inner wheel element 15a which are continuous with respect to the both axial end edges of the cylindrical surface part 24 which is the outer circumferential surface of the inner wheel element 15a serve as the flat surface parts 25a and 25b which have the circular ring shape and are orthogonal to the central axis of the inner wheel element 15a, respectively. In other words, the both axial end edges of the cylindrical surface part 24 which is the outer circumferential surface of the inner wheel element 15a each have a circular shape in which the axial position is not changed in the circumferential direction. For this reason, in the case of this embodiment, in the outer wheel element 16a, the portion which is superimposed on the radially outer side with respect to the outer circumferential surface of the inner wheel element 15a has almost the same radial thickness over the entire axial length including both axial end edge parts in the portions in which the plurality of teeth 20a and 20a configuring the worm wheel tooth part 19a are positioned.

Figure 6:
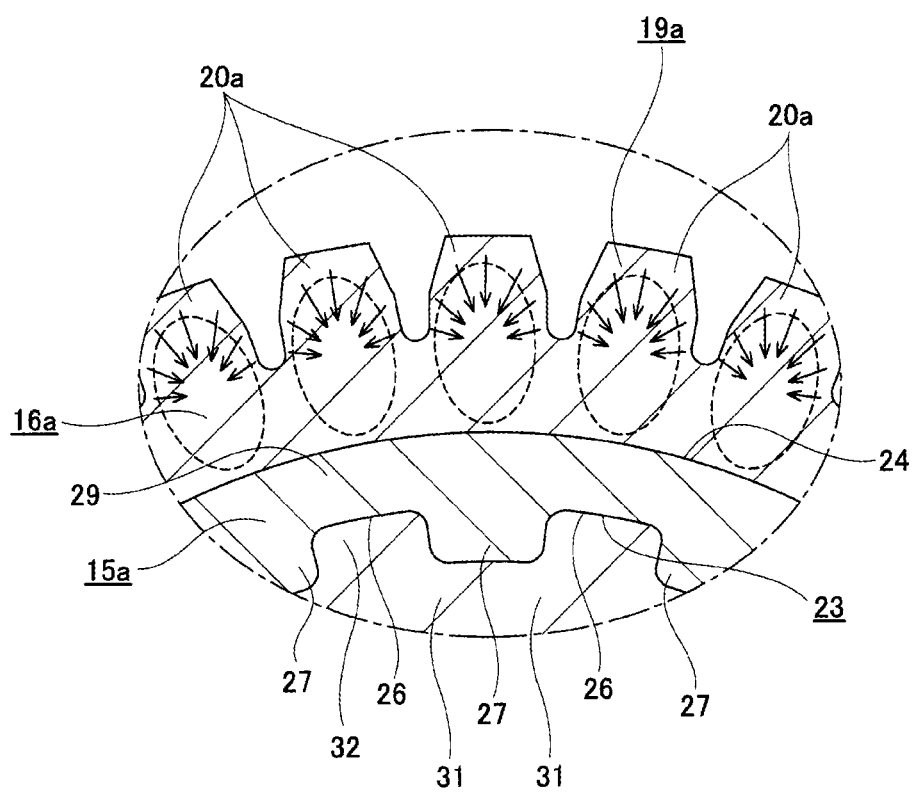
FIG. 6 is an enlarged view of B portion of FIG. 5 according to the first embodiment.

Accordingly, in the outer wheel element 16a, as illustrated in FIG. 6, the portion which is superimposed on the radially outer side with respect to at least the outer circumferential surface of the inner wheel element 15a can be set such that the amount of the molding shrinkage, which occurs during the injection molding, of the portions in which the plurality of teeth 20a and 20a are positioned is almost the same. As a result, the plurality of teeth 20a and 20a after molding can be set to have almost the same magnitude (radial thickness), so as to suppress the manufacturing error such as the pitch error with respect to the worm wheel tooth part 19a.

The plurality of concave parts 26 and the plurality of the convex parts 27 configuring the concave-convex part 23 are formed in parallel to the axial direction. For this reason, it is suppressed that the concave-convex part 23 causes the deformation of the outer wheel element 16a associated with the molding shrinkage of the synthetic resin, and the outer wheel element 16a can be molded accurately.

In a state where the worm reduction gear is assembled, the entire engaging portion 50 of the worm tooth part 18 and the worm wheel tooth part 19a is radially superimposed with the cylindrical surface part 24. In other words, in the worm wheel tooth part 19a, the worm tooth part 18 is engaged with the portion which suppresses the manufacturing error such as the pitch error as described above. For this reason, it is possible to make the engaged state of the engaging portion 50 excellent. Incidentally, in a case where the invention is implemented, in a case where only the axial portion of the engaging portion 50 is radially superimposed with the cylindrical surface part 24, the engaged state of the engaging portion becomes more excellent as a ratio (axial range) to be superimposed becomes larger.

In order that the entire engaging portion 50 is radially superimposed with the cylindrical surface part 24, the axial width dimension S of the engaging portion 50 is equal to or less than the axial width dimension T of the cylindrical surface part 24 (S T). However, under the condition, if the dimensions S and T are set to be almost the same, in a state where the axial dimension of the inner wheel element 15a is suppressed to a minimum extent, the engaged state of the engaging portion 50 can be made excellent. Incidentally, such a point is also applied to a case where the condition of S>T is adopted.

The axial distance X between the axial other-side surface (the axial other-side surface of the projecting part 43) of the outer wheel element 16a and the axial one-side surface of the inner ring 33a becomes smaller than the axial distance Y between the axial other-side surface (the axial other-side surface of the radial intermediate portion of the second suppression part 42) of the outer wheel element 16a and the axial one-side surface of the outer ring 34a (X<Y). For this reason, for example, although a portion which regulates the axial position of the output shaft 7 with respect to the housing 3 is broken so that the output shaft 7 and the worm wheel 4a are displaced to the axial other side, the axial other-side surface of the outer wheel element 16a contacts only the axial one-side surface (the axial other-side surface of the projecting part 43) of the inner ring 33a among the axial one-side surface of the inner ring 33a and the axial one-side surface of the outer ring 34a, and does not contact the axial one-side surface (the axial other-side surface of the radial intermediate portion of the second suppression part 42) of the outer ring 34a. Thus, it can be prevented that the rotation of the worm wheel 4a is locked.

Second Embodiment

Figure 8:
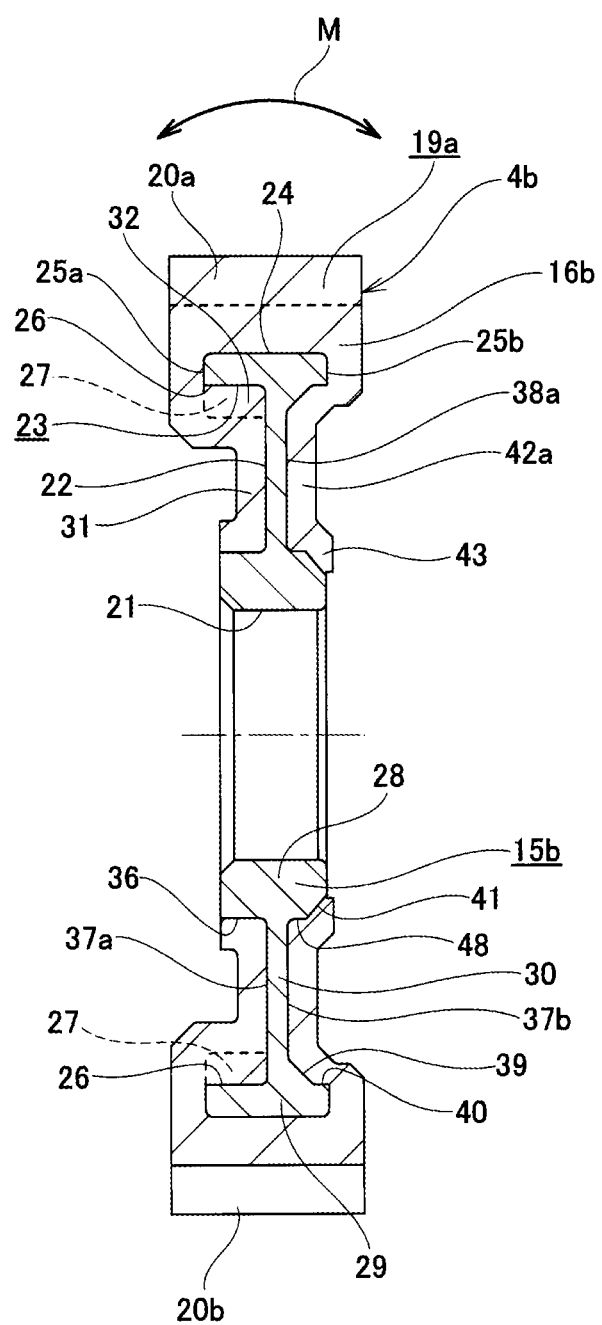
FIG. 8 is a sectional view of a worm wheel according to a second embodiment of the invention.

A second embodiment of the invention will be described with reference to FIG. 8.

In the case of this embodiment, a second annular concave part 38a provided in an axial other-side surface (the right surface in FIG. 8) of an inner wheel element 15b configuring a worm wheel 4b is configured to be different from the case of the above-described first embodiment. In the case of this embodiment, the inner diameter side circumferential surface configuring the inner surface of the second annular concave part 38a is formed such that respective axial end edges of an inner diameter side cylindrical surface part 48 which is provided in a half portion on the axial one side (left side in FIG. 8) and corresponds to the non-tilted surface part and the inner diameter side tilted surface part 41 provided in a half portion of the axial other side are continuous to each other.

In the case of this embodiment having such a configuration, the inner diameter side cylindrical surface part 48 is provided in the axial half portion of the inner diameter side circumferential surface configuring the inner surface of the second annular concave part 38a. Thus, the engaging power of the second annular concave part 38a and a second suppression part 42a configuring an outer wheel element 16b with respect to the moment M can be enlarged compared to a case where the entire inner diameter side circumferential surface serves as the inner diameter side tilted surface part 41 (the inner diameter side cylindrical surface part 48 is not provided). As a result, it is possible to enlarge the holding power of the outer wheel element 16b in the direction of the moment M with respect to the inner wheel element 15b.

The other configuration and effect are similar with the case of the above-described first embodiment.

Third Embodiment

Figure 9:
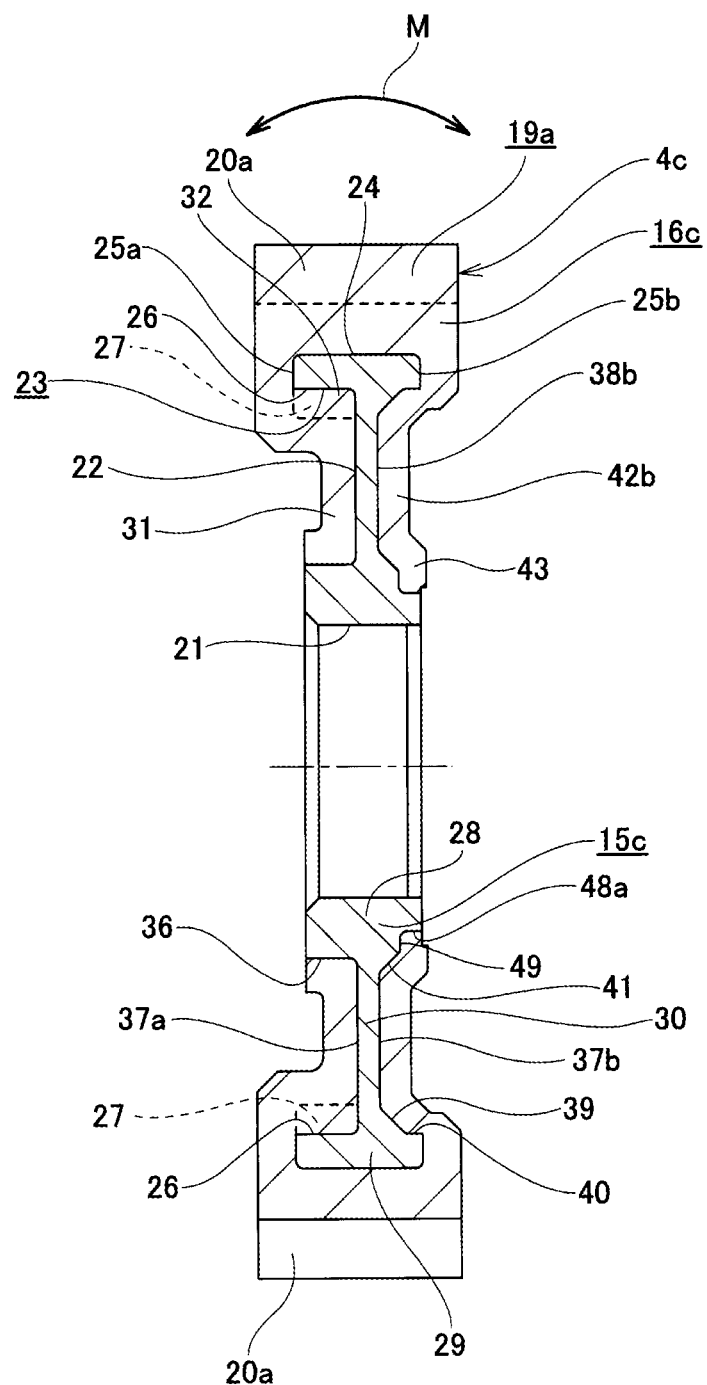
FIG. 9 is a sectional view of a worm wheel according to a third embodiment of the invention.

A third embodiment of the invention will be described with reference to FIG. 9.

In the case of this embodiment, a second annular concave part 38b provided in an axial other-side surface (the right surface in FIG. 9) of an inner wheel element 15c configuring a worm wheel 4c is configured to be different from the case of the above-described first embodiment. In the case of this embodiment, the inner diameter side circumferential surface configuring the inner surface of the second annular concave part 38b is formed such that the inner diameter side tilted surface part 41 provided in a half portion on the axial one side (left side in FIG. 9) and an inner diameter side cylindrical surface part 48a which is provided in a half portion of the axial other side and corresponds to the non-tilted surface part are continuous through a stepped surface 49 which has a circular ring shape and is directed to the axial other side.

In the case of this embodiment having such a configuration, the inner diameter side cylindrical surface part 48a is provided in the axial other half portion of the inner diameter side circumferential surface configuring the inner surface of the second annular concave part 38b. Thus, the engaging power of the second annular concave part 38b and a second suppression part 42b configuring an outer wheel element 16c with respect to the moment M can be enlarged compared to a case where the entire inner diameter side circumferential surface serves as the inner diameter side tilted surface part 41 (the inner diameter side cylindrical surface part 48a is not provided). As a result, it is possible to enlarge the holding power of the outer wheel element 16c in the direction of the moment M with respect to the inner wheel element 15c.

The other configuration and effect are similar with the case of the above-described first embodiment.

Fourth Embodiment

Figure 10:
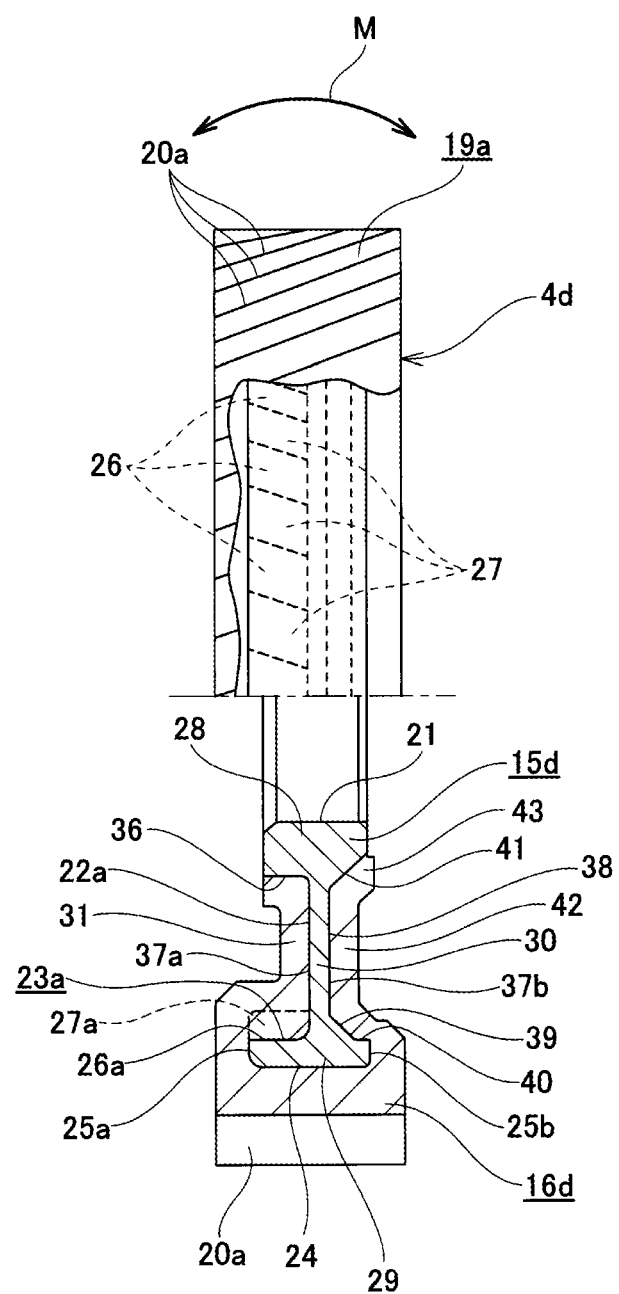
FIG. 10 is a half-sectional view of a worm wheel according to a fourth embodiment of the invention when partially cut away.

A fourth embodiment of the invention will be described with reference to FIG. 10.

In the case of this embodiment, a first annular concave part 22a provided in an axial one-side surface (the left surface in FIG. 10) of an inner wheel element 15d configuring a worm wheel 4d is configured to be different from the case of the above-described first embodiment. In the case of this embodiment, in the inner surface of the first annular concave part 22a, a plurality of concave parts 26a and a plurality of convex parts 27a configuring the concave-convex part 23a provided in the outer diameter side circumferential surface are formed to be tilted in an inverse direction to the tilted direction of the plurality of teeth 20a and 20a configuring the worm wheel tooth part 19a provided in the outer circumferential surface of the outer wheel element 16d with respect to the central axis of the worm wheel 4d.

In the case of this embodiment, the tilted direction of the plurality of teeth 20a and 20a configuring the worm wheel tooth part 19a and the tilted direction of the plurality of concave parts 26a and the plurality of convex parts 27a configuring the concave-convex part 23a are set to be opposite to each other with respect to the central axis of the worm wheel 4d. Thus, when the torque is transmitted from the worm shaft 6 (see FIGS. 3 and 21) to the worm wheel 4d, a force is applied in a direction in which the synthetic resin configuring the outer wheel element 16d does not come out from the plurality of concave parts 26a and 26a configuring the concave-convex part 23a toward the axial one side.

The other configuration and effect are similar with the case of the above-described first embodiment.

Fifth Embodiment

Figure 11:
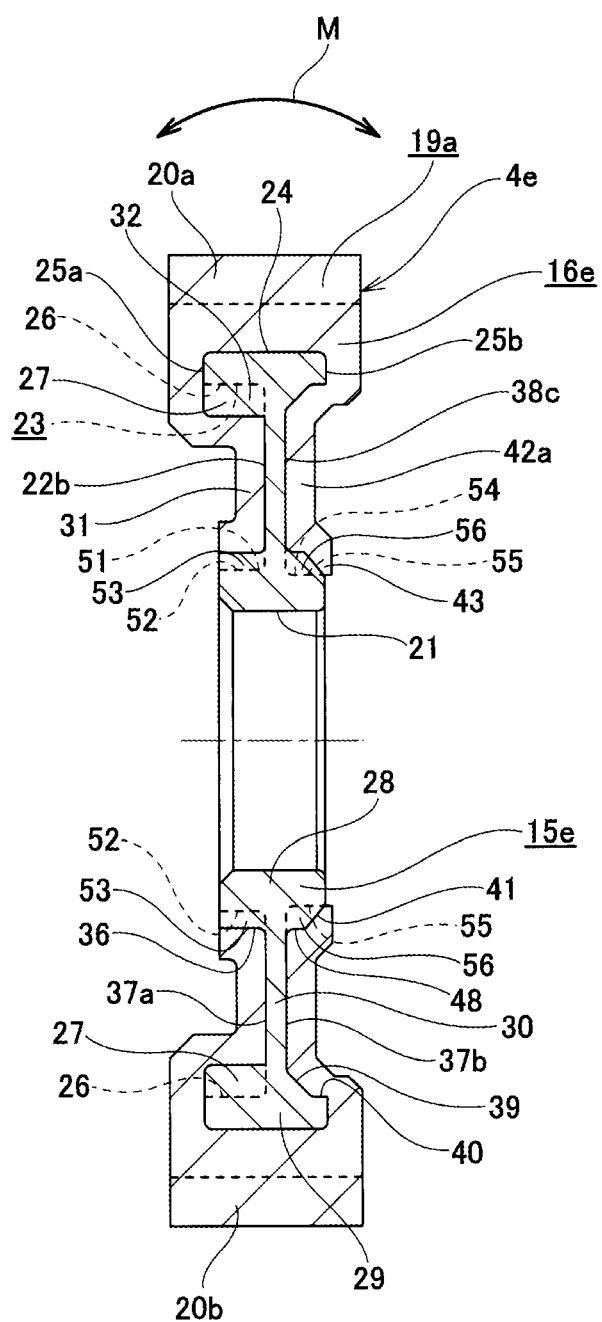
FIG. 11 is a sectional view of a worm wheel according to a fifth embodiment of the invention.

A fifth embodiment of the invention will be described with reference to FIG. 11. The case of this embodiment is a modification of the second embodiment illustrated in FIG. 8.

In the case of this embodiment, an (gear-shaped) concave-convex part 51 in the circumferential direction which is formed by alternately arranging the concave part 52 and the convex part 53 in the circumferential direction is provided in the inner diameter side circumferential surface configuring the first annular concave part 22b provided in an axial one-side surface (the left surface in FIG. 11) of an inner wheel element 15e configuring a worm wheel 4e. Further, an (gear-shaped) concave-convex part 54 in the circumferential direction which is formed by alternately arranging the concave part 55 and the convex part 56 in the circumferential direction is provided in the inner diameter side circumferential surface configuring the inner surface of the second annular concave part 38c provided in the axial other-side surface (the right surface in FIG. 11) of the inner wheel element 15e. Further, the synthetic resin configuring the outer wheel element 16e enters into the concave parts 52 and 52 configuring the concave-convex part 51 and the concave parts 55 and 55 configuring the concave-convex part 54. Further, the holding power of the outer wheel element 16e in the rotation direction with respect to the inner wheel element 15e is improved on the basis of the engagement of both concave-convex parts 51 and 54 and the synthetic resin.

The other configuration and effect are similar with the case of the above-described second embodiment.

Sixth Embodiment

Figure 12:
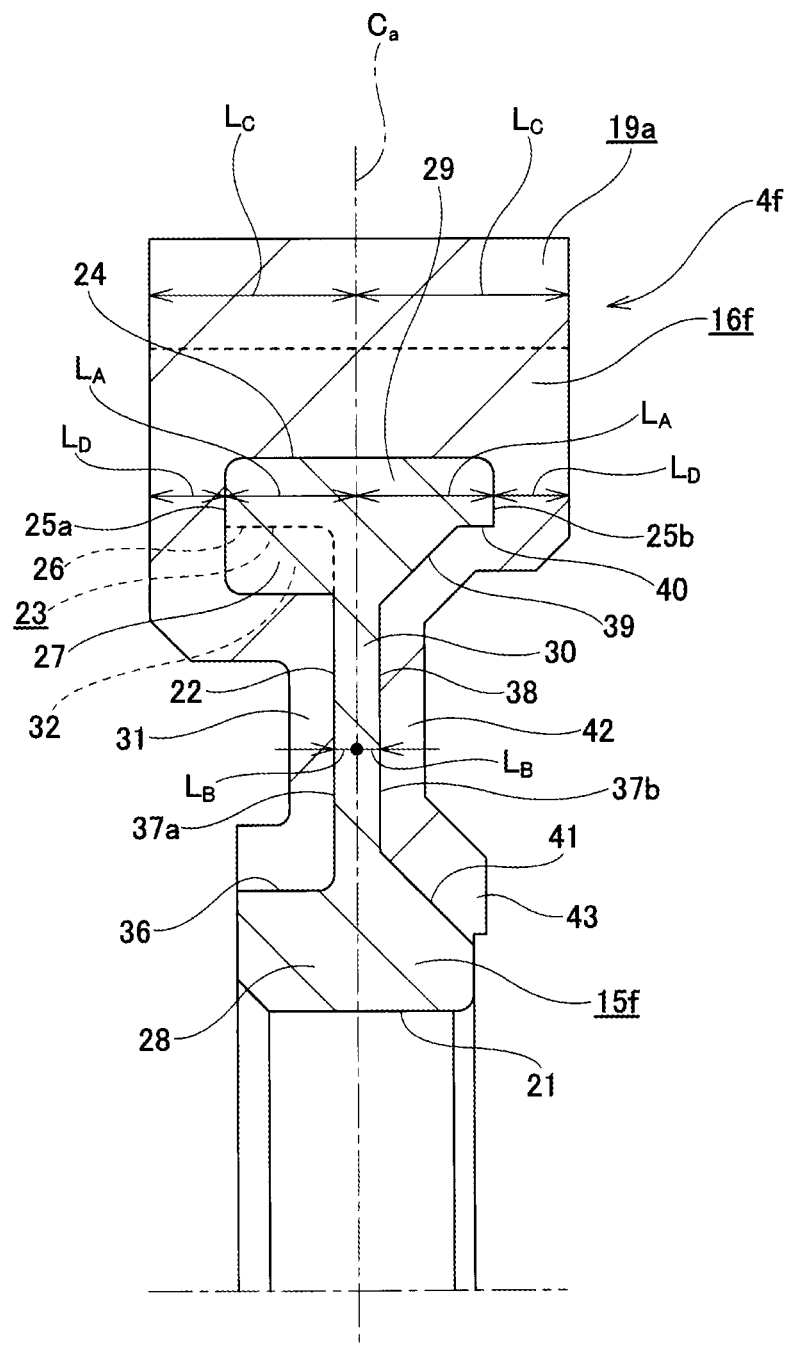
FIG. 12 is a half-sectional view of a worm wheel according to a sixth embodiment of the invention.
Figure 13:
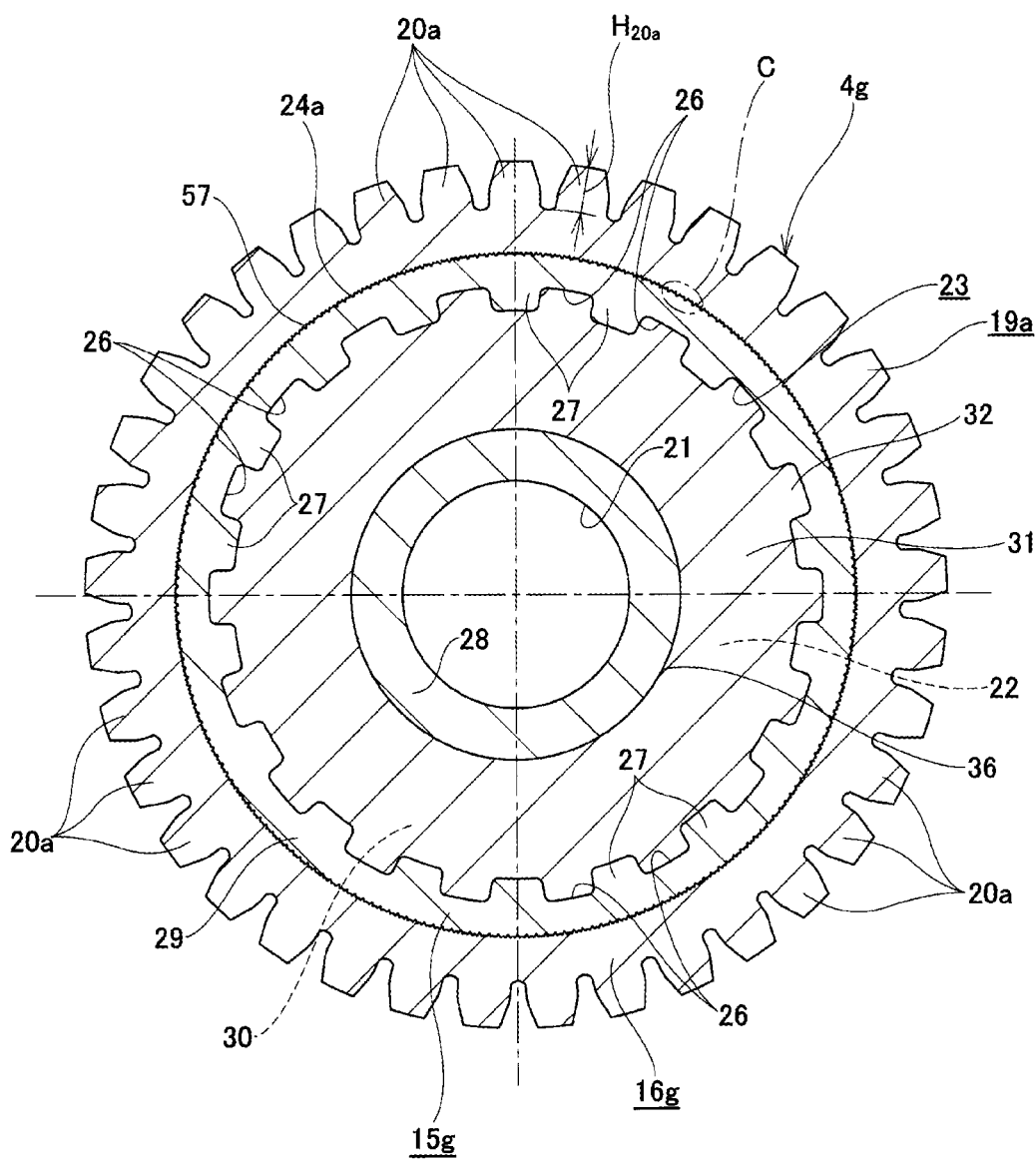
FIG. 13 is a sectional view similar with FIG. 5 according to a seventh embodiment of the invention.
Figure 15:
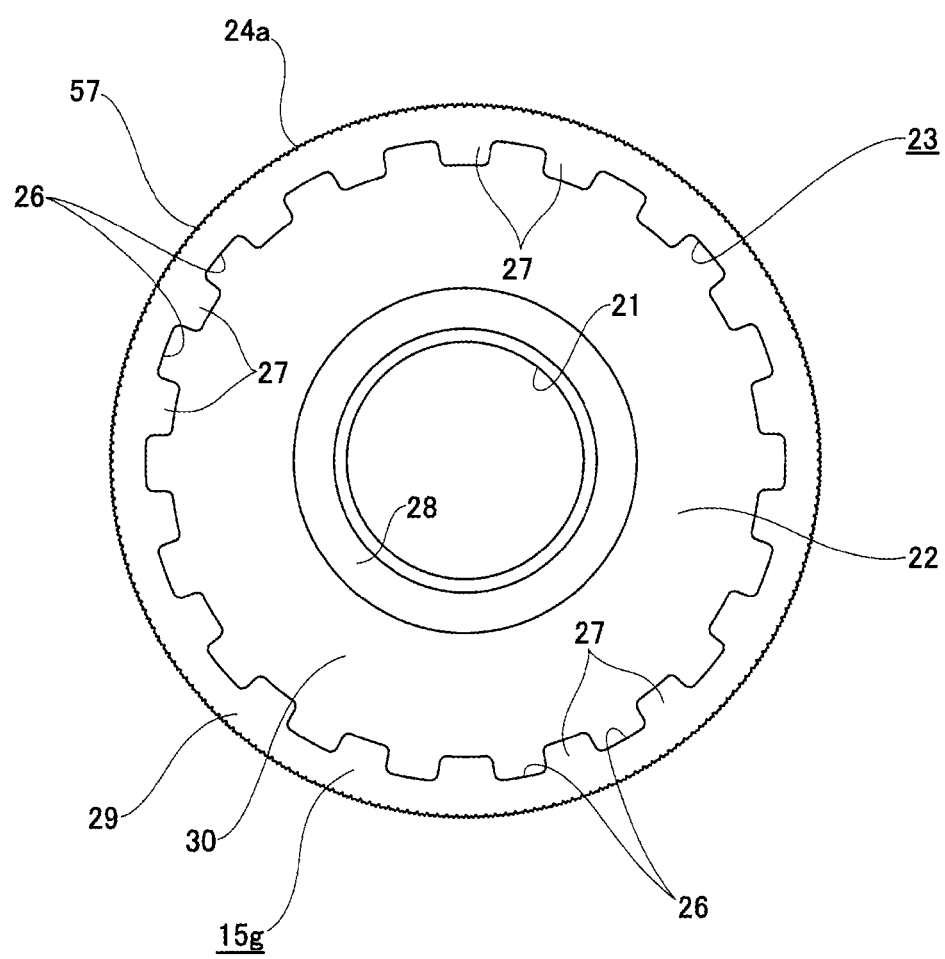
FIG. 15 is a view of an inner wheel element according to the seventh embodiment when viewed from an axial one side.
Figure 16:
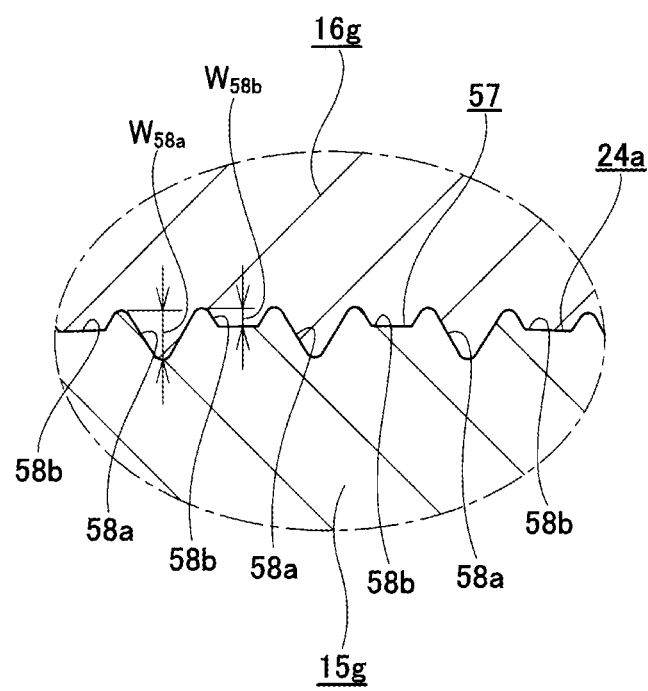
FIG. 16 is an enlarged view of C portion of FIG. 13 according to the seventh embodiment.

A sixth embodiment of the invention will be described with reference to FIG. 12. The case of this embodiment is a modification of the first embodiment illustrated in FIGS. 1 to 7.

In the case of this embodiment, the portion (outer diameter side annular part 29) positioned on the radially outer side from both first and second annular concave parts 22 and 38 in an inner wheel element 15f configuring a worm wheel 4f, and the portion (connection part 30) which is interposed between the bottom surfaces (intermediate flat surface parts 37a and 37b) configuring the inner surfaces of the both first and second annular concave parts 22 and 38 in the inner wheel element 15f are each formed such that the axial dimensions of the both portions which interpose a central position Ca of the inner wheel element 15f in the axial direction are the same as each other (as $L_A$ or $L_B$).

The portion (including the worm wheel tooth part 19a) positioned on the radially outer side from the inner wheel element 15f in an outer wheel element 16f configuring the worm wheel 4f, and the portion (the portion positioned on both axial sides of the outer diameter side annular part 29) superimposed in the axial direction with respect to the portion (outer diameter side annular part 29) positioned on the radially outer side from the both first and second annular concave parts 22 and 38 of the inner wheel element 15f in the outer wheel element 16f are each formed such that the axial dimensions of the both portions which interpose the central position Ca in the axial direction are the same as each other (as $L_C$ or $L_D$).

In the case of this embodiment having the above-described configuration, when the inner wheel element 15f and the outer wheel element 16f configuring the worm wheel 4f is expanded thermally (contracted thermally) on the basis of the temperature change, in the above-described portions, the axial dimensions $L_A$, $L_B$, $L_C$, and $L_D$ of both portions which interpose the central position Ca in the axial direction are each changed equally. For this reason, it can be prevented effectively that the engagement of the worm wheel tooth part 19a and the worm tooth part 18 (see FIG. 3) is deviated according to the temperature change.

The other configuration and effect are similar with the case of the above-described first embodiment.

Seventh Embodiment

A seventh embodiment of the invention will be described with reference to FIGS. 13 to 16. This embodiment is a modification of the above-described first embodiment illustrated in FIGS. 1 to 7.

In the case of this embodiment, a surface of a cylindrical surface part 24a provided in an outer circumferential surface of an inner wheel element 15g configuring a worm wheel 4g serves as a knurling surface 57 which is a minute concave-convex surface formed by a knurling process. In the case of this embodiment, a flat-pattern surface in which a direction in which the concave-convex is formed is in parallel to the axial direction as illustrated in the upper half portion of FIG. 14A is adopted as the knurling surface 57. However, in a case where the invention is implemented, for example, a twill-pattern surface in which a direction in which the concave-convex is formed is tilted to and intersected with the axial direction as illustrated in the upper half portion of FIG. 14B may be adopted.

In any case, in the case of this embodiment, radial depth dimensions $W_{58a}$ and $W_{58b}$ of minute concave parts 58a and 58b configuring the knurling surface 57 are set to be equal to or less than one tenth ($W_{58a} \leq H_{20a}/10$ and $W_{58b} \leq H_{20a}/10$) of the radial height dimension (tooth depth) $H_{20a}$ of the teeth 20a configuring the worm wheel tooth part 19a provided in the outer circumferential surface of the outer wheel element 16g.

In the case of this embodiment, a portion of the synthetic resin configuring the outer wheel element 16g enters into the minute concave parts 58a and 58b configuring the knurling surface 57.

In the case of this embodiment having the above-described configuration, the holding power of the outer wheel element 16g in the rotation direction with respect to the inner wheel element 15g can be improved on the basis of the engagement of a portion of the synthetic resin configuring the outer wheel element 16g and the minute concave parts 58a and 58b configuring the knurling surface 57. Incidentally, if a twill-pattern surface is adopted as the knurling surface 57, the holding power in the direction of the moment M as well as the holding power of the outer wheel element 16g in the rotation direction with respect to the inner wheel element 15g can be improved on the basis of the engagement of a portion of the synthetic resin configuring the outer wheel element 16g and the minute concave parts 58a and 58b configuring the knurling surface 57.

In the case of this embodiment, the knurling surface 57 has a minute concave-convex shape ($W_{58a} \leq H_{20d}/10$ and $W_{58b} \leq H_{20d}/10$). Thus, the entire volume of the synthetic resin is hardly affected although a portion of the synthetic resin configuring the outer wheel element 16g enters into the minute concave parts 58a and 58b configuring the knurling surface 57. For this reason, even in the case of this embodiment, in the outer wheel element 16g, the portion which is superimposed on the radially outer side with respect to the knurling surface 57 can be set to have almost (substantially) the same radial thickness in the portions in which the plurality of teeth 20a and 20a configuring the worm wheel tooth part 19a are positioned. Accordingly, even in the case of this embodiment, the molding shrinkage amounts of the teeth 20a and 20a at the time of injection-molding the outer wheel element 16g can be set to be almost the same as each other. Thus, it is possible to suppress the manufacturing error such as the pitch error with respect to the worm wheel tooth part 19a.

The other configuration and effect are similar with the case of the above-described first embodiment.

Eighth Embodiment

Figure 17:
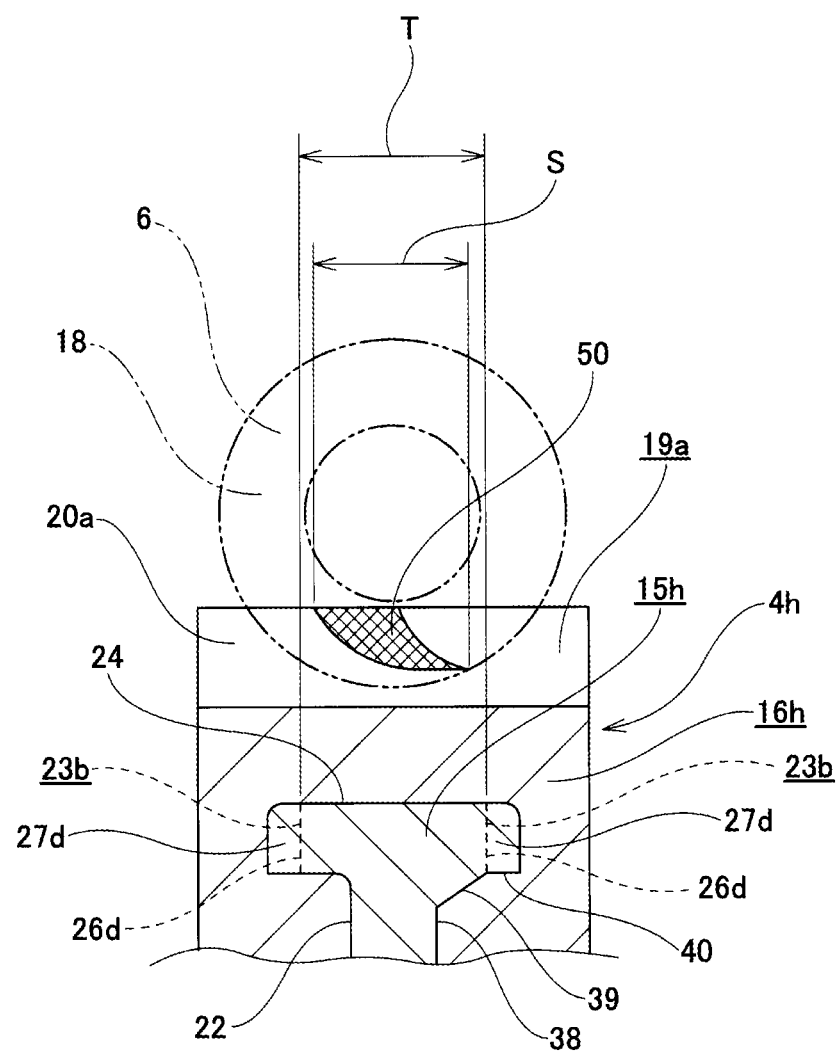
FIG. 17 is a view similar with FIG. 3 according to an eighth embodiment of the invention.

An eighth embodiment of the invention will be described with reference to FIG. 17. This embodiment is a modification of the above-described first embodiment illustrated in FIGS. 1 to 7.

In the case of the worm reduction gear of this embodiment, the cylindrical surface part 24 is provided only in an axial intermediate portion of an outer circumferential surface of an inner wheel element 15h configuring a worm wheel 4h, and the entire engaging portion 50 of the worm tooth part 18 and the worm wheel tooth part 19a is configured to be radially superimposed with the cylindrical surface part 24.

In the case of this embodiment, the radially outer end parts (the portions which are positioned on the radially outer side from first and second annular concave parts 22 and 38) of the both axial surfaces of the inner wheel element 15h are each provided with a concave-convex part 23b formed by alternately arranging a concave part 26b and a convex part 27b in the circumferential direction. The concave-convex part 23b is provided in the axial range which is adjacent to both axial sides of the cylindrical surface part 24. Further, in the case of this embodiment, when a portion of a synthetic resin configuring an outer wheel element 16h enters into the concave parts 26b configuring the concave-convex parts 23b and 23b, the holding power of the outer wheel element 16h in the rotation direction with respect to the inner wheel element 15h is improved.

Even in the case of this embodiment having the above-described configuration, the entire engaging portion 50 is radially superimposed with the cylindrical surface part 24. Thus, the manufacturing error such as the pitch error with respect to the worm wheel tooth part 19a can be suppressed in the axial range (the axial range in which the cylindrical surface part 24 is positioned) in which the engaging portion 50 is positioned. Accordingly, the engaged state of the engaging portion 50 can be made excellent.

Incidentally, in the illustrated example, the concave-convex part 23 (see FIGS. 2 and 3) is not provided in the outer diameter side circumferential surface configuring the inner surface of the first annular concave part 22. However, in a case where the invention is implemented, the concave-convex part 23 can be provided (for example, in the state of being continuous to the concave-convex part 23b on the axial one side).

The other configuration and effect are similar with the case of the above-described first embodiment.

Ninth Embodiment

Figure 18:
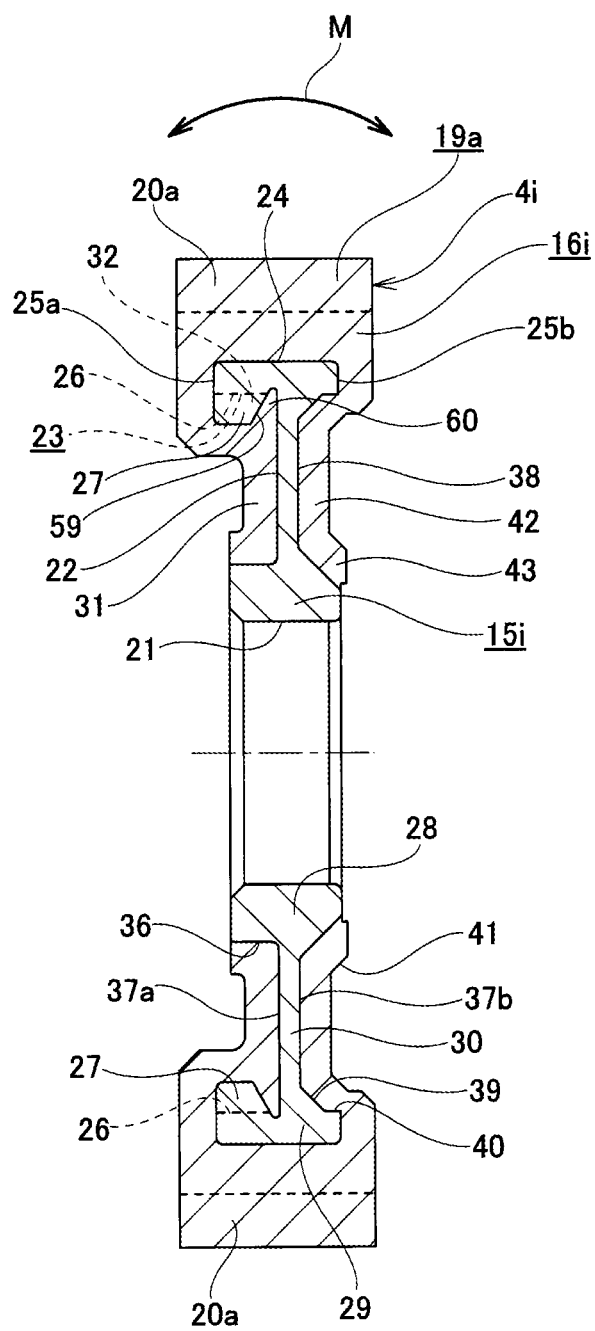
FIG. 18 is a sectional view of a worm wheel according to a ninth embodiment of the invention.

A ninth embodiment of the invention will be described with reference to FIGS. 18 and 19. This embodiment is a modification of the above-described first embodiment illustrated in FIGS. 1 to 7.

In the case of this embodiment, in the outer diameter side circumferential surface configuring the inner surface of the first annular concave part 22 provided in an axial one-side surface of an inner wheel element 15i configuring a worm wheel 4i, a sub concave part 59 is provided to be recessed radially outward over the entire circumference in an axial deep end part (which is an axial other end portion and a right end part in FIGS. 18 and 19) of the first annular concave part 22. Further, the cross section of the sub concave part 59 with respect to a virtual plane including the central axis of the inner wheel element 15i has a V shape such that the width dimension in the axial direction becomes smaller from an opening part on the inner diameter side toward the bottom part on the outer diameter side.

In the case of this embodiment, the concave-convex part 23 is provided in the entire portion deviated from the sub concave part 59 in the outer diameter side circumferential surface configuring the inner surface of the first annular concave part 22. Further, the axial deep end parts of the concave parts 26 configuring the concave-convex part 23 are opened to the inner surfaces of the sub concave parts 59, respectively. Incidentally, in the case of this embodiment, the radial depth of the sub concave part 59 is slightly larger than the radial depth of the concave part 26 configuring the concave-convex part 23. Herein, in a case where the invention is implemented, the radial depth of the sub concave part 59 may be configured to be the same as the radial depth of the concave part 26 or be configured to be less than the radial depth of the concave part 26.

In the case of this embodiment, in a synthetic resin configuring an outer wheel element 16i, a portion of the portion (the suppression part 31 having an annular shape) having entered into the first annular concave part 22 enters into the entire sub concave part 59 to cover the entire inner surface of the sub concave part 59, so as to configure a sub suppression part 60 (which has a shape coinciding with the sub concave part 59) engaged with the sub concave part 59.

In the case of this embodiment having the above-described configuration, the holding power of the outer wheel element 16i in the direction of the moment M with respect to the inner wheel element 15i can be improved on the basis of the engagement of the sub concave part 59 and the sub suppression part 60.

Figure 19:
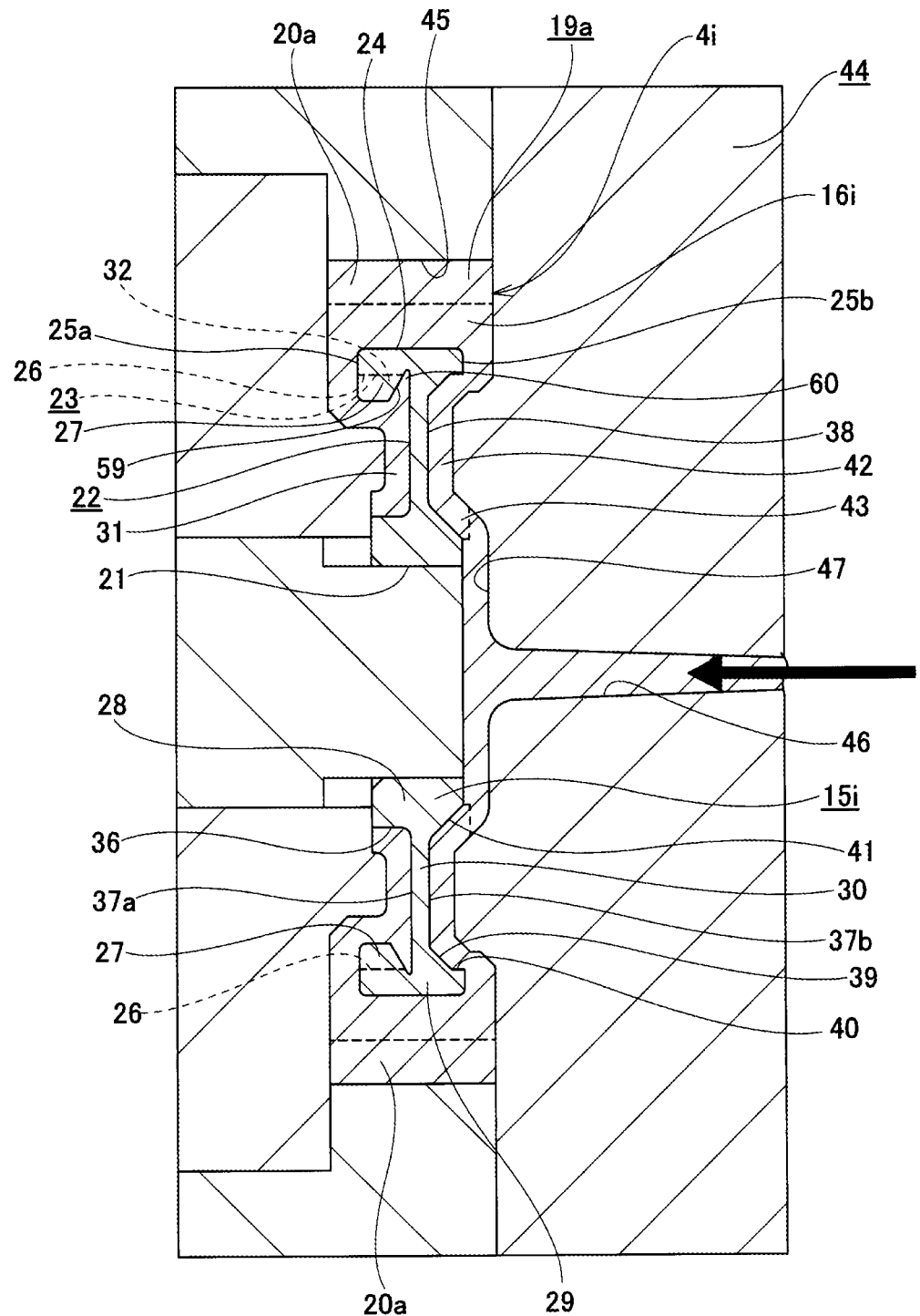
FIG. 19 is a sectional view illustrating a state where an outer wheel element according to the ninth embodiment is injection-molded.

In the case of this embodiment, as illustrated in FIG. 19, when the outer wheel element 16i is injection-molded, the molten resin fed into the cavity 45 through the runner 46 and the disc gate 47 reaches the portion corresponding to the suppression part 31 (sub suppression part 60) and stops. For this reason, the sub suppression part 60 (sub concave part 59) can prevent that the flow of the molten resin into the cavity 45 is hindered. Particularly, in the case of this embodiment, the cross section of the sub concave part 59 has a V shape such that the width dimension in the axial direction becomes smaller from the opening part on the inner diameter side toward the bottom part on the outer diameter side. The molten resin can smoothly enter from the opening part of the sub concave part 59 toward the bottom part. Accordingly, it can be prevented that the flow of the molten resin into the cavity 45 is hindered, and the moldability of the sub suppression part 60 can be made excellent.

In the case of this embodiment, when the inner wheel element 15i is manufactured, after the sub concave part 59 is molded with respect to the outer diameter side circumferential surface configuring the inner surface of the first annular concave part 22, in a case where the concave-convex part 23 is molded by the plastic process such as cold forging, the sub concave part 59 may be used as an escape part of a molding die of the concave-convex part 23 or an escape part of a metal material deformed according to the molding of the concave-convex part 23. As a result, the molding load of the concave-convex part 23 is suppressed to be low, so as to reduce the molding facility capacity of the concave-convex part 23 and to improve the lifetime of the molding die. Herein, in a case where the invention is implemented, after the concave-convex part 23 is molded, the sub concave part 59 may be molded by the cutting process or the like.

The other configuration and effect are similar with the case of the above-described first embodiment.

Incidentally, in a case where the invention is implemented, the invention may be implemented by appropriately combining the configurations of the above-described embodiments.

In the above-described embodiment, the inner wheel element is formed of metal. However, in a case where the invention is implemented, for example, the inner wheel element may be formed of a synthetic resin which is excellent in the thermal resistance compared to the synthetic resin configuring the outer wheel element. Also in this case, it is possible to obtain the effect similar with the case of the above-described embodiments.

In the structure of the above-described embodiment, in the surface of the inner wheel element, if at least one portion (for example, the cylindrical surface part and the entire surface of the inner wheel element, and in the case of the above-described seventh embodiment, the portion deviated from the knurling surface 57) in the portions which are covered with the synthetic resin configuring the outer wheel element serves as a minute concave-convex surface formed by various kinds of processes such as a knurling process, an emboss process, and a shot blast, a portion of the synthetic resin configuring the outer wheel element enters into the concave part configuring the minute concave-convex surface. Thus, it is possible to improve the holding power (adhesiveness) of the outer wheel element with respect to the inner wheel element. Incidentally, also in a case where such a configuration is adopted, if the depth of the concave part configuring the minute concave-convex surface is set to be equal to or less than one tenth (for example, equal to or less than one twentieth or equal to or less than one thirtieth) of the radial height of the teeth configuring the worm wheel tooth part, so as to hardly make an effect on the volume of the synthetic resin configuring the outer wheel element, it can be suppressed that the manufacturing error occurs in the portion engaged with the worm tooth part in the worm wheel tooth part.

INDUSTRIAL APPLICABILITY

The worm wheel and the worm reduction gear of the invention are not limited to the electric power steering device, but may be used in various kinds of mechanical devices such as a wiper device in an assembled state.

The present application is based on Japanese Patent Application (No. 2016-018233) filed on Feb. 2, 2016, Japanese Patent Application (No. 2016-204200) filed on Oct. 18, 2016, and Japanese Patent Application (No. 2016-249614) filed on Dec. 22, 2016. The contents thereof are incorporated hereinto by reference.

DESCRIPTION OF REFERENCE NUMERALS AND SIGNS 1 steering wheel
2 steering shaft
3 housing
4, 4a to 4i worm wheel
5 electric motor
6 worm shaft
7 output shaft
8a, 8b rolling bearing
9 torsion bar
10 torque sensor
11a, 11b universal joint
12 intermediate shaft
13 steering gear unit
14 pinion shaft
15, 15a to 15i inner wheel element
16, 16a to 16i outer wheel element
17 concave-convex part
18 worm tooth part
19, 19a worm wheel tooth part
20, 20a teeth
21 fitting hole
22, 22a, 22b first annular concave part
23, 23a, 23b concave-convex part
24, 24a cylindrical surface part
25a, 25b flat surface part
26 26a concave part
27 27a convex part
28 inner diameter side annular part
29 outer diameter side annular part
30 connection part
31 first suppression part
32 rotation holding part
33a, 33b inner ring
34a, 34b outer ring
35a, 35b ball
36 cylindrical surface part
37a, 37b intermediate flat surface part
38, 38a to 38c second annular concave part
39 outer diameter side tilted surface part 40 outer diameter side cylindrical surface part
41 inner diameter side tilted surface part
42, 42a, 42b second suppression part
43 projecting part
44 molding device
45 cavity
46 runner
47 disc gate
48, 48a inner diameter side cylindrical surface part
49 stepped surface
50 engaging portion
51 concave-convex part
52 concave part
53 convex part
54 concave-convex part
55 concave part
56 convex part
57 knurling surface
58a, 58b minute concave part
59 sub concave part
60 sub suppression part

The invention claimed is:

1. A worm reduction gear comprising:
a housing;
a rotation shaft which is supported to be rotatable with respect to the housing;
a worm wheel which has a worm wheel tooth part in an outer circumferential surface and is externally fitted and fixed to the rotation shaft; and
a worm shaft which has a worm tooth part in an axial intermediate portion of an outer circumferential surface and is supported to be rotatable with respect to the housing in a state where the worm tooth part is engaged with the worm wheel tooth part, wherein:
the worm wheel includes:
an inner wheel element; and
an outer wheel element;
the inner wheel element has a first annular concave part provided to be recessed in an axial direction in an axial one-side surface;
the outer wheel element is made of a synthetic resin, and has a worm wheel tooth part in an outer circumferential surface, and the inner wheel element is embedded in the outer wheel element, such that a continuous range from an inner diameter side circumferential surface configuring an inner surface of the first annular concave part, through an outer circumferential surface of the inner wheel element, to a portion adjacent a radially inner end of an axial other-side surface of the inner wheel element in a surface of the inner wheel element is covered over an entire circumference; and
the outer circumferential surface of the inner wheel element configuring the worm wheel is formed to be the cylindrical surface part in an axial range which is radially superimposed with an entire of an engaging portion of the worm wheel tooth part and the worm tooth part.

2. The worm reduction gear according to claim 1, wherein:
a second annular concave part is provided to be recessed in the axial direction in the axial other-side surface of the inner wheel element; and
the inner wheel element is embedded in the outer wheel element, such that a continuous range from the inner diameter side circumferential surface configuring the inner surface of the first annular concave part through the outer circumferential surface of the inner wheel element to an inner diameter side circumferential surface configuring an inner surface of the second annular concave part in the surface of the inner wheel element is covered over an entire circumference.

3. The worm reduction gear according to claim 2, wherein a tilted surface part which is tilted in a direction in which a width dimension in a radial direction of the second annular concave part becomes larger toward an axial other side with respect to a central axis of the inner wheel element is provided in at least one circumferential surface among an outer diameter side circumferential surface and the inner diameter side circumferential surface configuring the inner surface of the second annular concave part.

4. The worm reduction gear according to claim 3, wherein the tilted surface part and a non-tilted surface part which is not tilted with respect to the central axis of the inner wheel element are provided in the outer diameter side circumferential surface configuring the inner surface of the second annular concave part.

5. The worm reduction gear according to claim 4, wherein the tilted surface part and the non-tilted surface part which is not tilted with respect to the central axis of the inner wheel element are provided in the inner diameter side circumferential surface configuring the inner surface of the second annular concave part.

6. The worm reduction gear according to claim 2, wherein:
in the inner wheel element, a portion which is positioned on a radially outer side from the first annular concave part and the second annular concave part and a portion which is interposed between a bottom surface of the first annular concave part and a bottom surface of the second annular concave part are each formed such that axial dimensions of both portions which interpose a central position of the inner wheel element in the axial direction are the same as each other; and
in the outer wheel element, a portion which is positioned on a radially outer side from the inner wheel element and a portion which is superimposed in the axial direction with respect to the portion which is positioned on the radially outer side from the first annular concave part and the second annular concave part in the inner wheel element are each formed such that axial dimensions of both portions which interpose the central position of the inner wheel element in the axial direction are the same as each other.

7. The worm reduction gear according to claim 2, wherein:
a concave-convex part in a circumferential direction is provided in the surface of the inner wheel element; and
a portion of a synthetic resin configuring the outer wheel element enters into a concave part configuring the concave-convex part.

8. The worm reduction gear according to claim 7, wherein the concave-convex part is provided in the inner surface of the first annular concave part.

9. The worm reduction gear according to claim 7, wherein:
the second annular concave part is provided to be recessed in the axial direction over the entire circumference in the axial other-side surface of the inner wheel element; and
the concave-convex part is provided in the inner surface of the second annular concave part.

10. The worm reduction gear according to claim 1, wherein:
- a sub concave part is provided to be recessed radially outward in a portion which is positioned on an axial deep side from an axial opening-side end edge of the first annular concave part in the outer diameter side circumferential surface configuring the inner surface of the first annular concave part; and
- a portion of the synthetic resin configuring the outer wheel element enters into the sub concave part.

11. The worm reduction gear according to claim 10, wherein
- a cross section of the sub concave part with respect to a virtual plane including the central axis of the inner wheel element has a V shape such that a width dimension in the axial direction becomes smaller from an opening part on an inner diameter side toward a bottom part on an outer diameter side.

12. The worm reduction gear according to claim 11, wherein
- in the surface of the inner wheel element, at least a portion of portions which are covered with the synthetic resin configuring the outer wheel element serves as a minute concave-convex surface.

13. The worm reduction gear according to claim 1, wherein
- a projecting part which projects on the axial other side from a portion adjacent to the radially outer side is provided in a radially inner end part of an axial other-side surface of the outer wheel element.

14. The worm reduction gear according to claim 1, wherein
- the entire outer circumferential surface of the inner wheel element serves as the cylindrical surface part.

15. The worm reduction gear according to claim 1, wherein:
- a rolling bearing which includes an inner ring, an outer ring, and a plurality of rolling bodies provided between an outer circumferential surface of the inner ring and an inner circumferential surface of the outer ring, and supports the rotation shaft to be rotatable with respect to the housing is provided in a portion adjacent to an axial other side of the worm wheel;
- an axial other-side surface of the outer wheel element configuring the worm wheel faces an axial one-side surface of the inner ring and an axial one-side surface of the outer ring in the axial direction; and
- an axial distance between the axial other-side surface of the outer wheel element and the axial one-side surface of the inner ring is smaller than an axial distance between the axial other-side surface of the outer wheel element and the axial one-side surface of the outer ring.

16. The worm reduction gear according to claim 15, wherein:
- a projecting part which projects on the axial other side from a portion adjacent to the radially outer side is provided in a radially inner end part of the axial other-side surface of the outer wheel element; and
- an axial other-side surface of the projecting part faces the axial one-side surface of the inner ring in the axial direction.

17. A manufacturing method of the worm reduction gear according to claim 1, the method comprising:
- positioning a radially outer end part of a disc gate in the radially inner end part of the axial other side of the outer wheel element when an insertion molding is performed in which the outer wheel element is coupled with the inner wheel element at the same time when the outer wheel element is manufactured by an injection molding.

* * * * *